United States Patent
Pellenc et al.

(10) Patent No.: US 6,834,487 B2
(45) Date of Patent: Dec. 28, 2004

(54) LEAF STRIPPER FOR SELECTIVE VINE LEAF STRIPPING

(75) Inventors: Roger Pellenc, Pertuis (FR); Christian Bonnard, Pertuis (FR)

(73) Assignee: Pellenc, Societe Anonyme, Pertuis (FR)

( * ) Notice: Subject to any disclaimer, the term of this patent is extended or adjusted under 35 U.S.C. 154(b) by 0 days.

(21) Appl. No.: 10/275,101

(22) PCT Filed: May 18, 2001

(86) PCT No.: PCT/FR01/01536
§ 371 (c)(1),
(2), (4) Date: May 5, 2003

(87) PCT Pub. No.: WO01/87047
PCT Pub. Date: Nov. 22, 2001

(65) Prior Publication Data
US 2003/0167746 A1 Sep. 11, 2003

(30) Foreign Application Priority Data
May 19, 2000 (FR) .............................................. 00 06459

(51) Int. Cl.[7] .............................................. A01D 46/00
(52) U.S. Cl. ........................................................ 56/330
(58) Field of Search ........................ 56/330, 331, 100.1, 56/27.5

(56) References Cited

U.S. PATENT DOCUMENTS 3,754,382 A * 8/1973 Rakestraw .................. 56/27.5
4,896,486 A * 1/1990 Lundahl et al. .......... 56/10.2 E

FOREIGN PATENT DOCUMENTS

| | | |
|---|---|---|
| DE | 29 31 564 A | 2/1981 |
| EP | 0 278 607 A | 8/1988 |
| EP | 0 597 253 A | 5/1994 |
| FR | 2 483 168 A | 12/1981 |

* cited by examiner

Primary Examiner—Árpád Fábián Kovács
(74) Attorney, Agent, or Firm—Harrison & Egbert

(57) ABSTRACT

An leaf stripping apparatus for stripping vines has a stripping head with a grid-type rotating suction drum rotatably mounted about a generally vertical axis, a suction cooperative with the stripping head for generating an air flow through the perforated cylindrical side wall of the suction drum, a channeling structure formed on the stripping head for channeling the air flow through the changing portion of the side of the suction drum, and a cutter affixed to the stripping head adjacent the changing portion of the side wall. The cutter is arranged generally parallel to the vertical axis of rotation of the rotating suction drum. The drum is suitable for positioning directly against the vine during movement of the stripping head therealong.

31 Claims, 22 Drawing Sheets

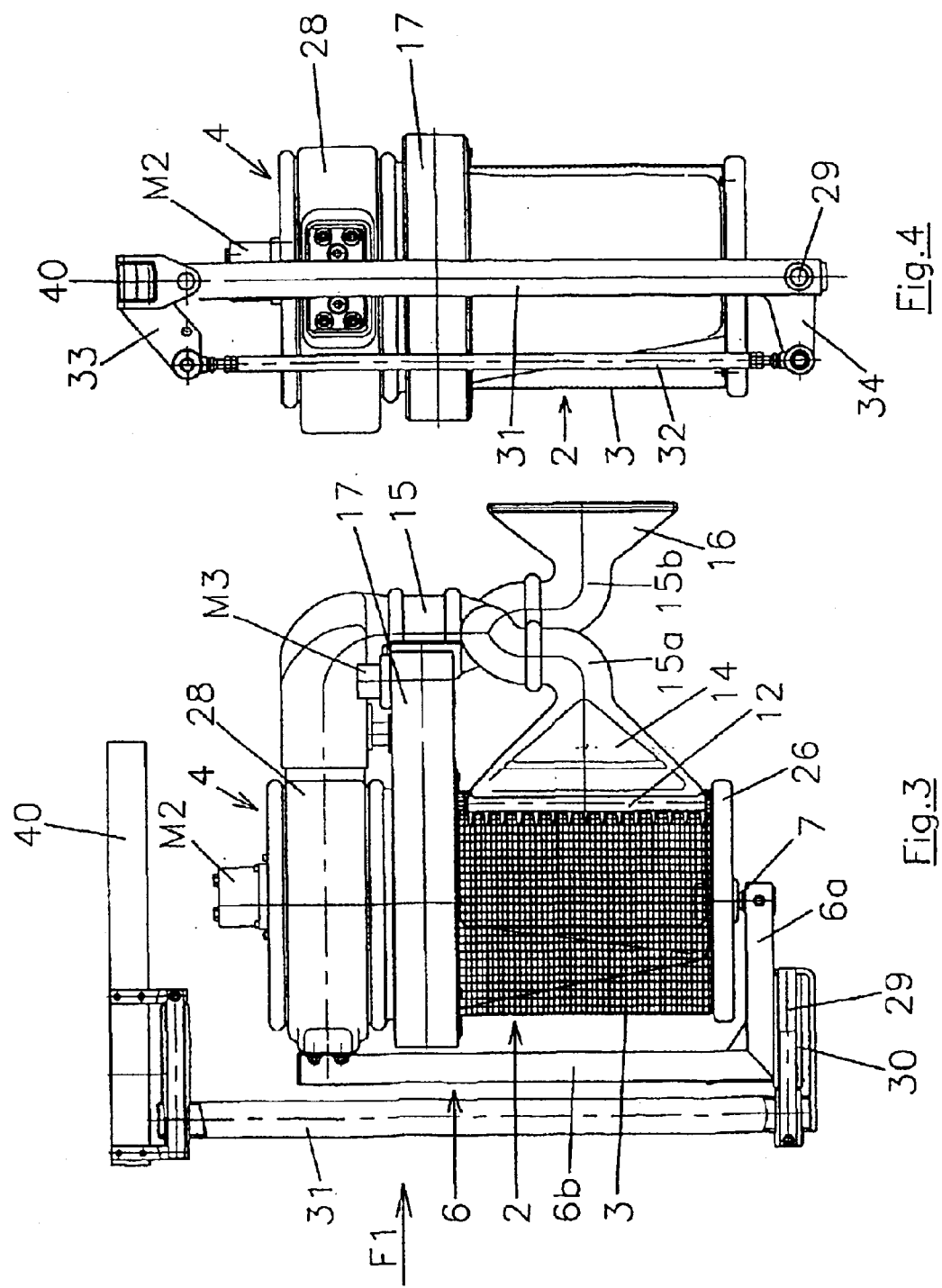

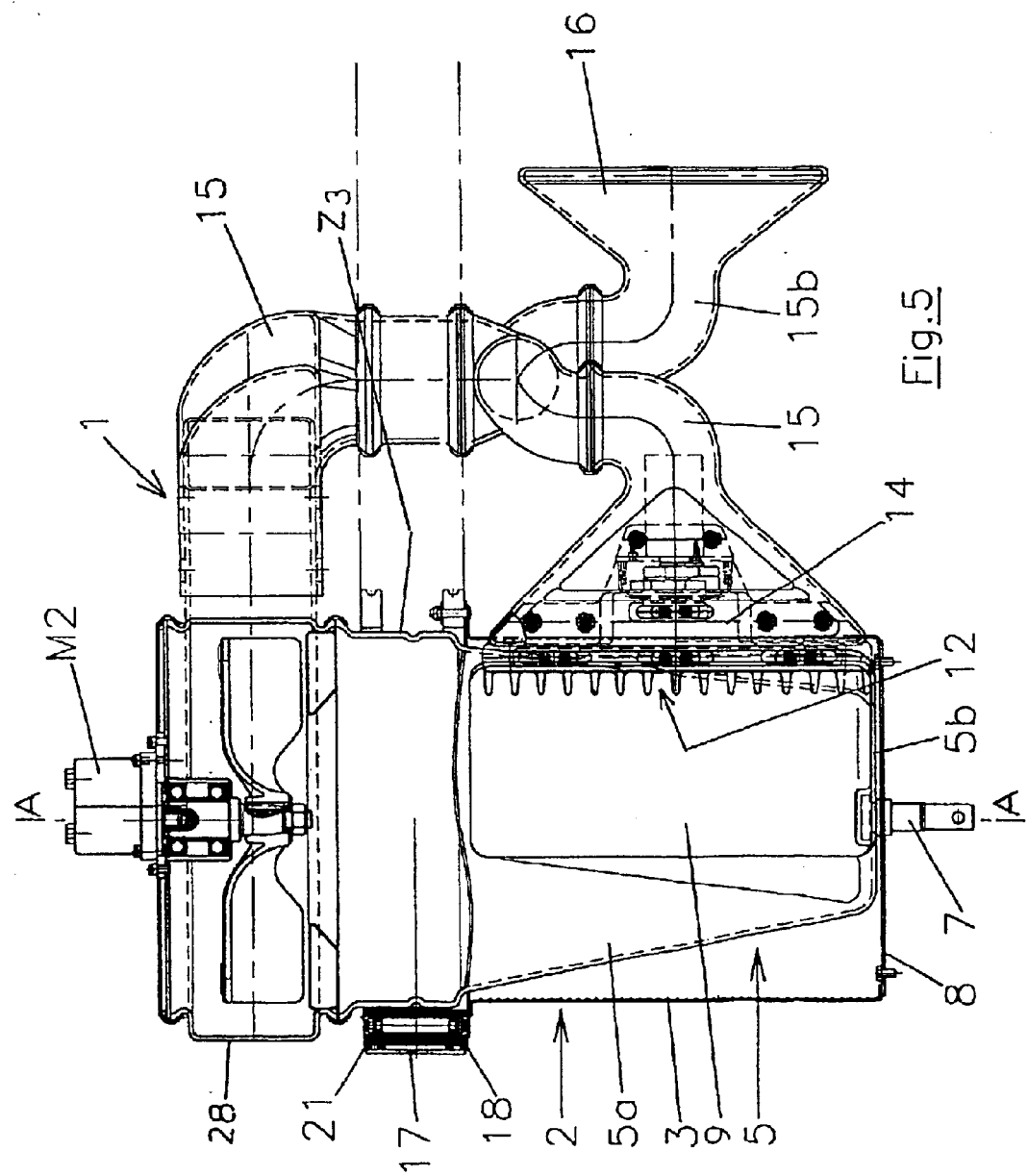

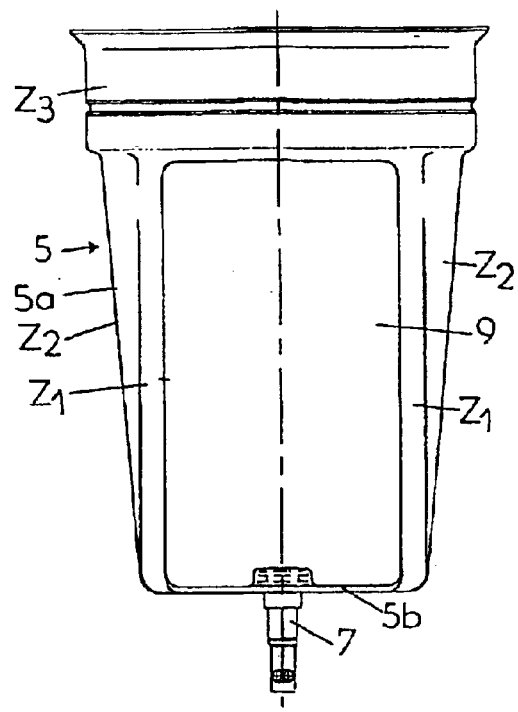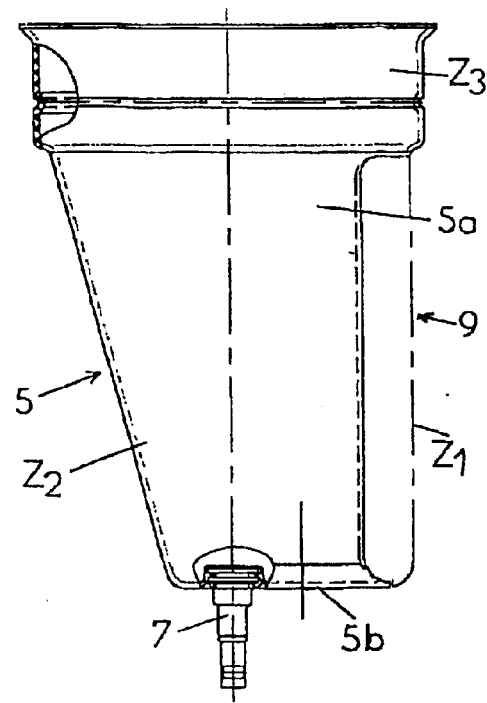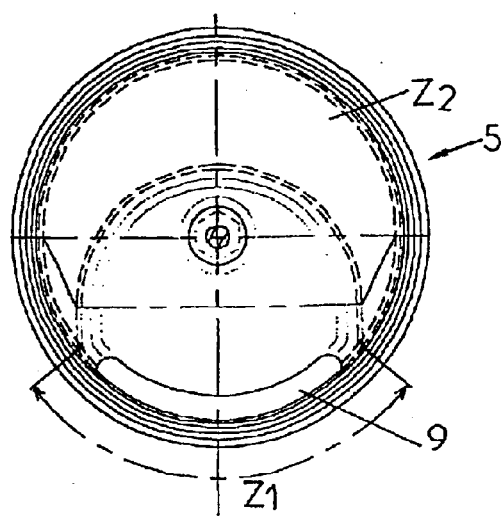

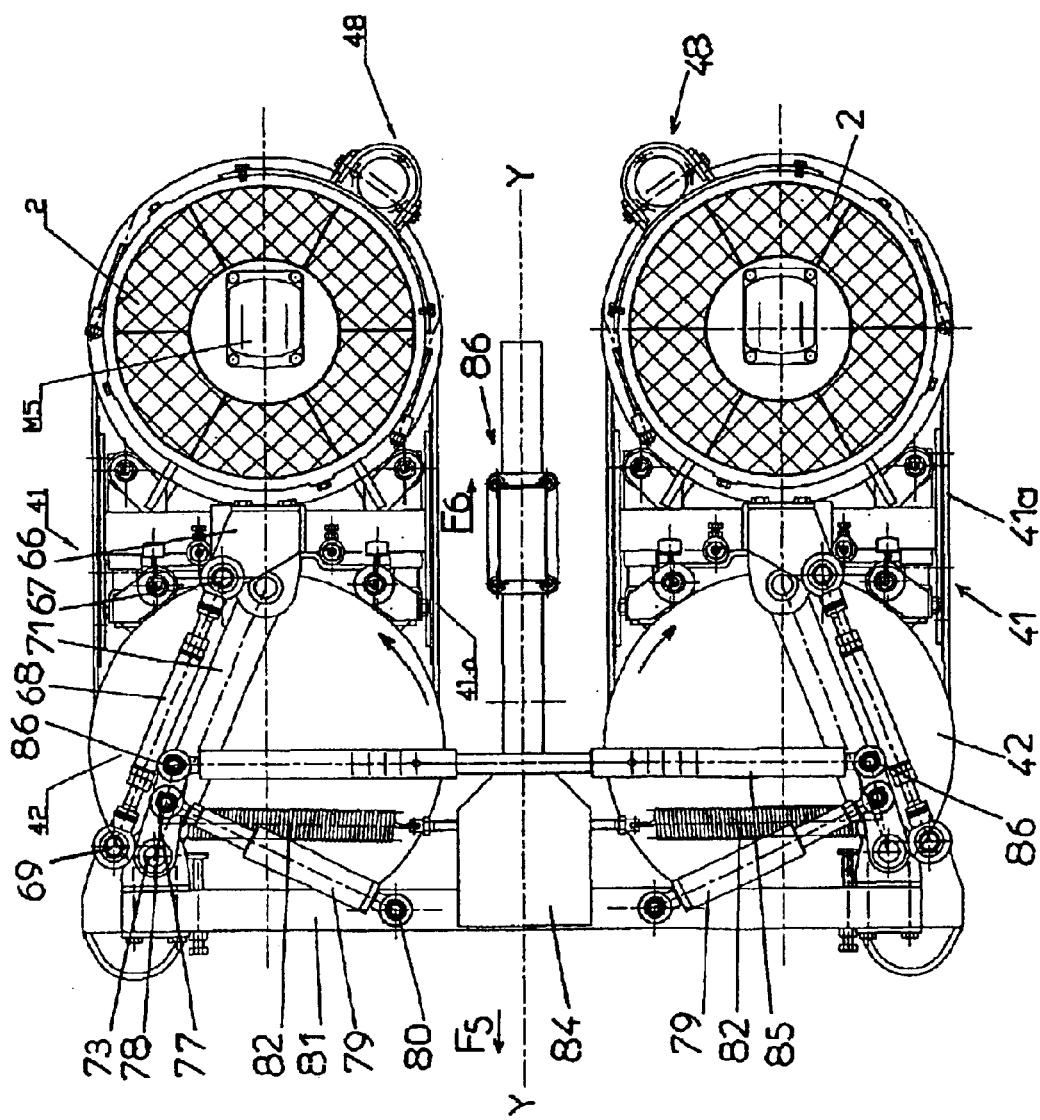

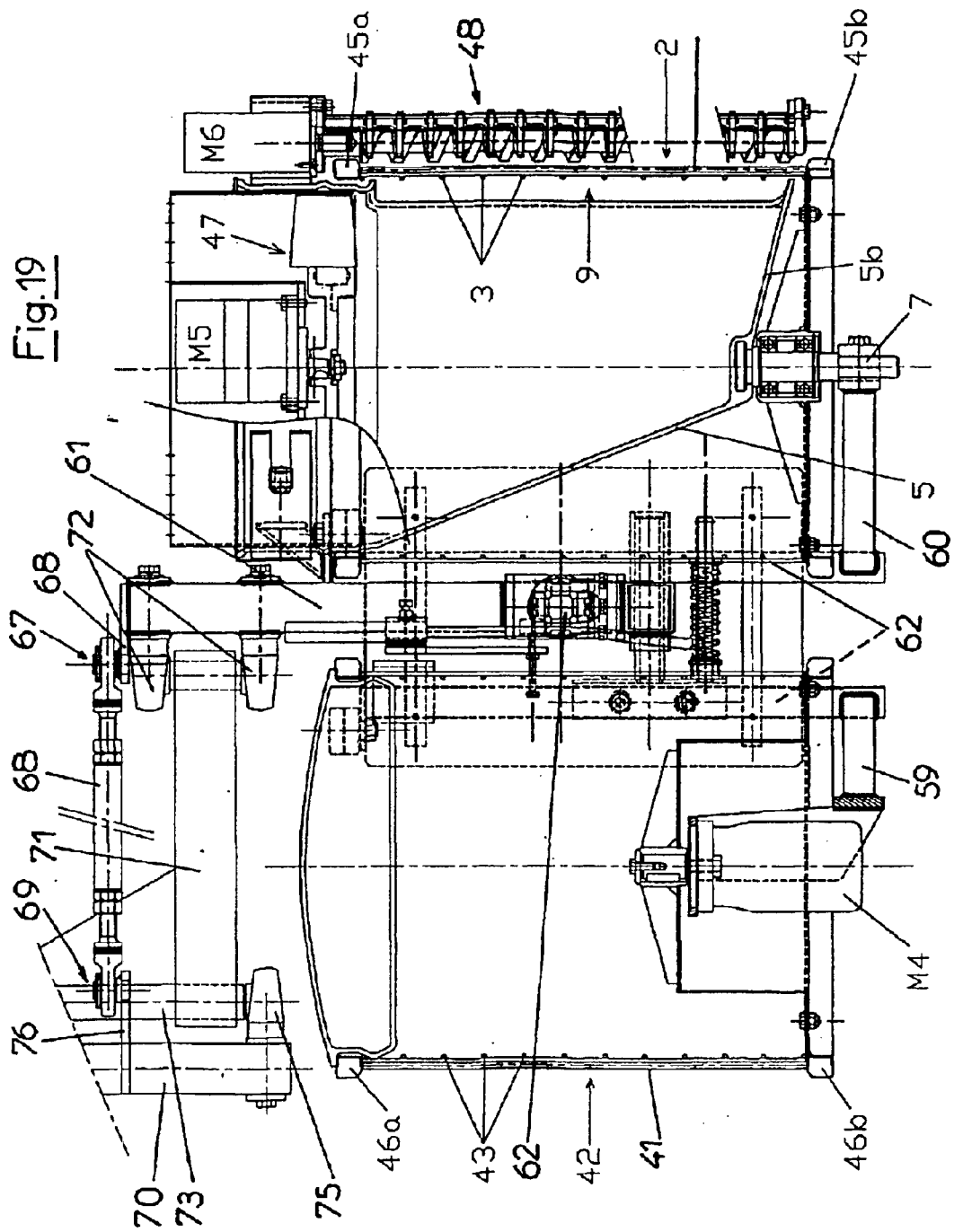

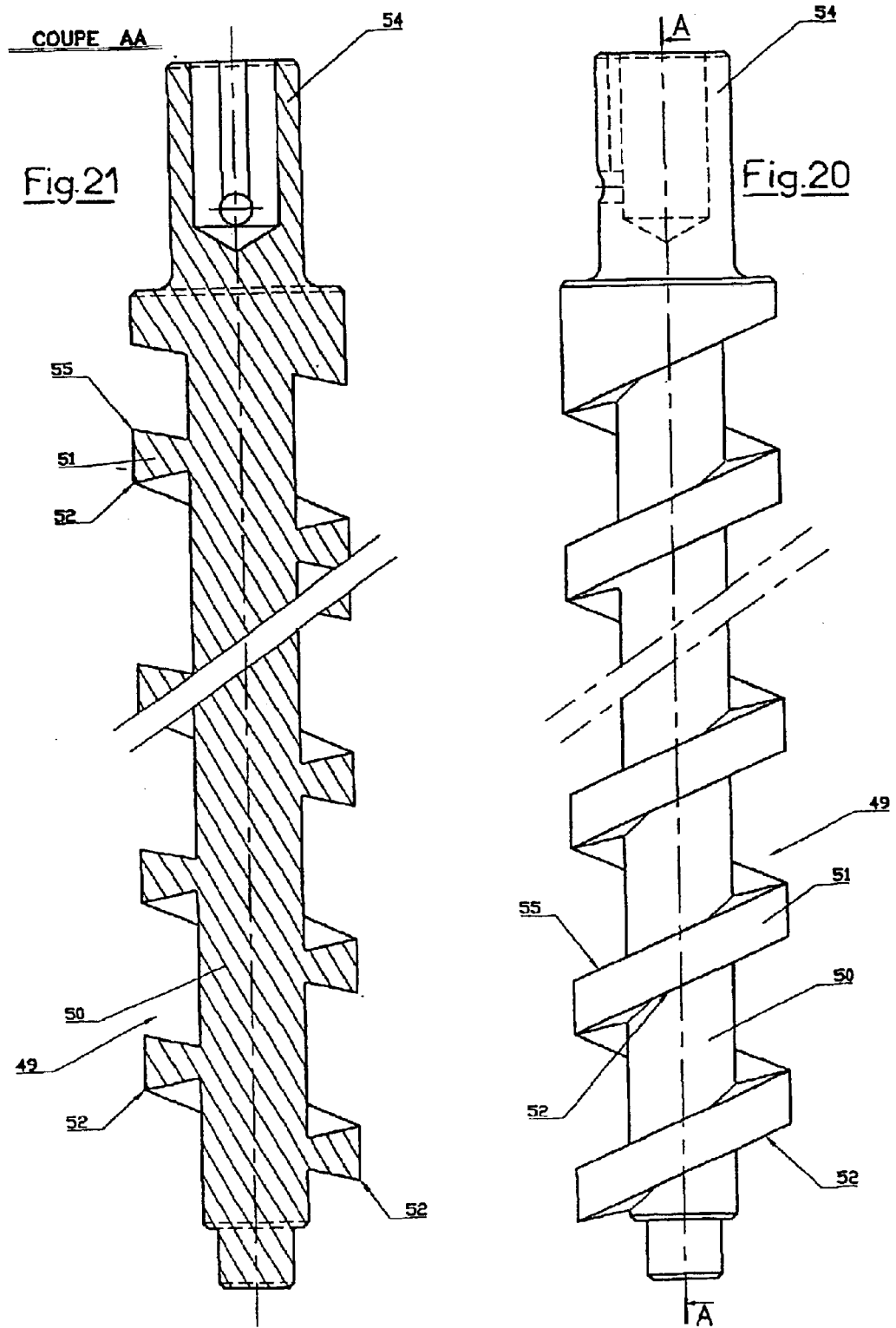

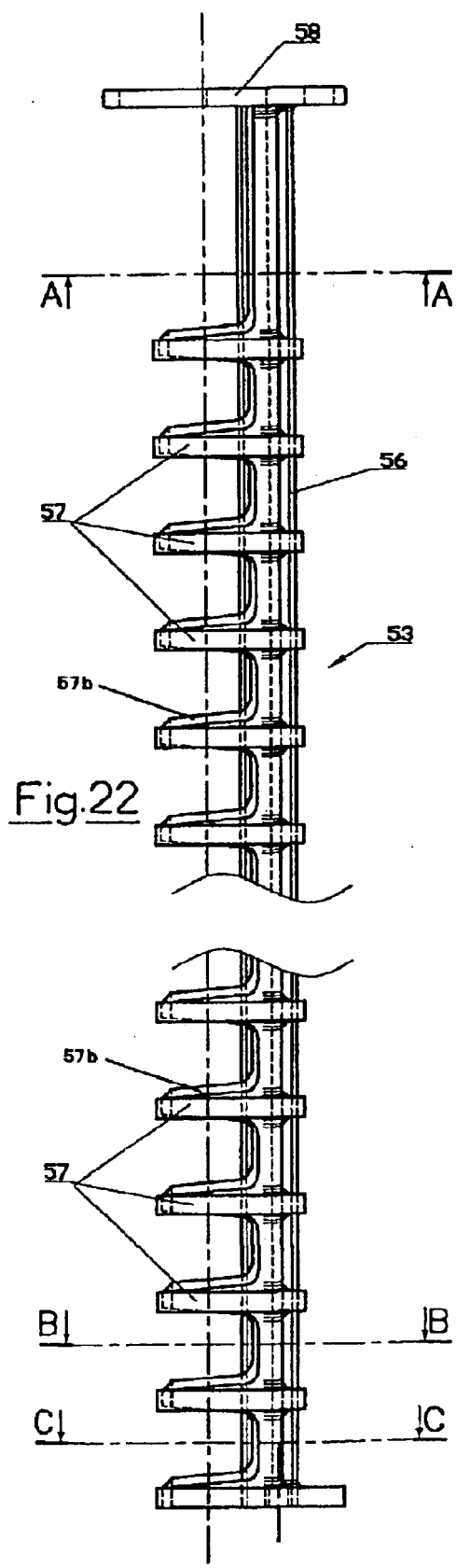

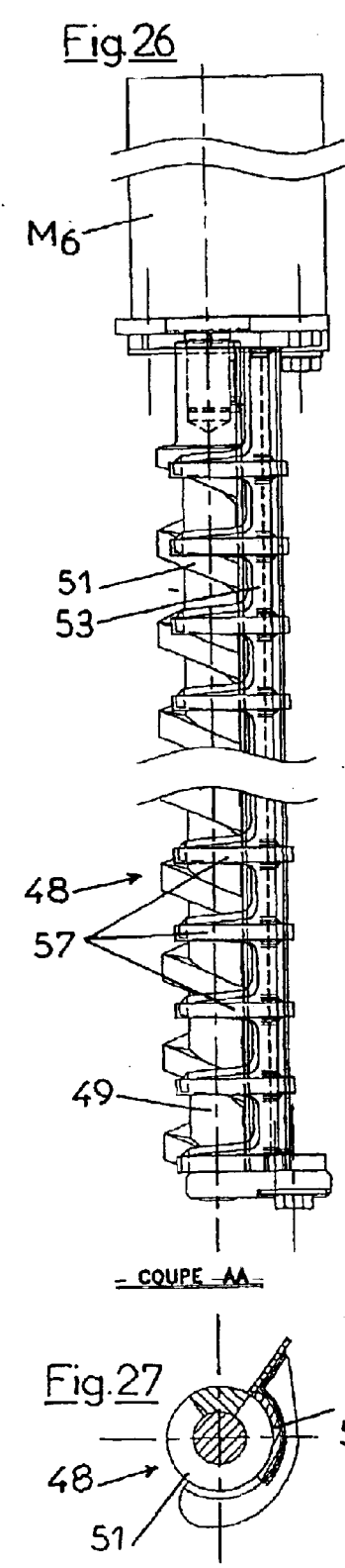
Fig.26
Fig.27
COUPE AA
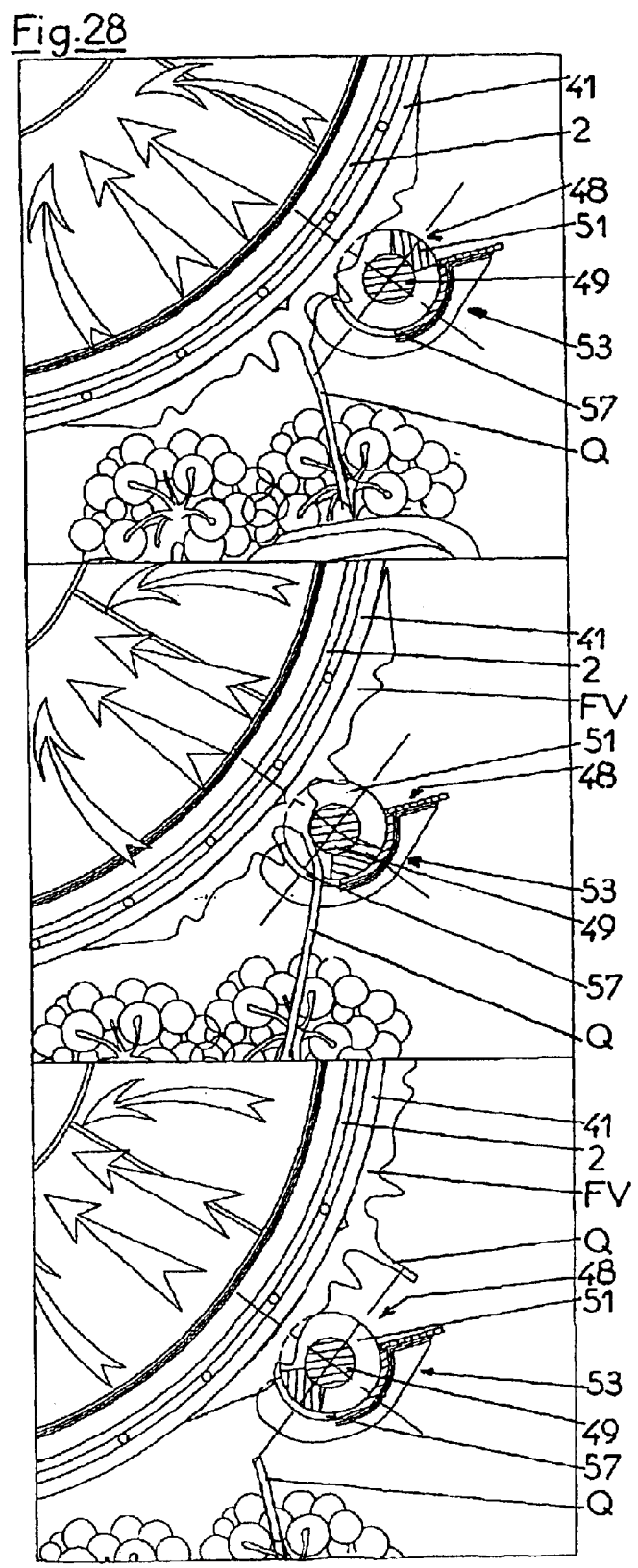
Fig.28

LEAF STRIPPER FOR SELECTIVE VINE LEAF STRIPPING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention concerns a leaf stripper, more specifically designed for vine leaf stripping.

BACKGROUND OF THE INVENTION

Leaf stripping is a technique that consists of removing the leaves located in the fruit-bearing area of the plants. Made manually for years in some vineyards, this operation that is aimed at improving the quality of the harvest and at facilitating the thinning and picking work has become of growing interest with the development of mechanical leaf stripping.

The advantages of leaf stripping are multiple:

To promote grape bunch aeration so as to reduce rot.

To promote thinning in order to improve coloration (thicker grape skin).

To thin the plant cover in the fruit-bearing area for better penetration and location of treatments (botrytis-oidium-grey rot-grape caterpillars-mildew . . . ).

To improve ripening of the bunches through better sun exposure (heavier bunches, more developed aromas, and better health status of the harvest).

To favor access to the grape bunches so as to reduce labor time on manual operations such as thinning (−50%), manual harvesting (−30%–40%).

To reduce foliage so as to limit juice losses upon leaf aspiration from the remainder of the mechanically harvested vintage.

To facilitate drying when raining through better sun exposure and better aeration.

Leaf stripping thus proves to be a very interesting operation that responds well to the concern for task optimization and harvest quality.

Several machines and processes have been proposed to date and some of them are actually still used for the performance of this work.

In document FR-2,147,932, a leaf stripping device is described that uses a grid-type rotating cylindrical cage designed to roll over the plant cover and inside which a hollow cylinder provided with an opening is housed in a fixed manner. An aspirator mounted above the interior hollow cylinder is used to create, inside the latter, a negative pressure for the purpose of aspirating foliage leaves and blow them against the grid-type rotating cage. Rollers mounted on hinged brackets are arranged under pressure against the lateral surface of the cage and driven by the latter in a rotating manner. The leaves become jammed between the grid-type drum and the rollers and are torn from the branches under the tractive force resulting from the movement of the machine.

A priori, the principle of foliage stripping using the suction flow of a turbine through a grid-type rotating drum designed to pull and blow the leaves against the lateral surface of said drum seems judicious and power-efficient. However, it does not seem that the machine described in document FR-2,417,932 has been put on the market and to the knowledge of the deponent, no leaf stripper using that principle is marketed today.

The lack of success of this machine results certainly from the fact that the leaf tearing principle using friction rollers does not seem to be concretely applied for several reasons:

according to the description and the drawings of document FR-2,417,932, the hinged supports mounted on springs with rollers are intended to be positioned in the plant cover during operation; this arrangement is not applicable since said supports rub in the plant cover and hinder aspiration of the leaves as they push back the vegetation; it is not possible to position mechanical components in the plant cover beyond the wall of the rotating cage as they would telescope and be torn by various obstacles located in the axis of the vine row, such as stakes, wire tighteners and mainly posts;

because a relatively large effort is necessary to tear off leaves, it is unlikely that the effort created by the friction of the rollers on the drum is sufficient, especially if leaves or stems come between the cage wall and the rollers; and this device, because of its location in relation to the plant cover and of its principle of severing leaves by tearing them off, can only cause plugging of the system through plant accumulation and damage the vine.

Document FR-2,390,084 describes a mechanical leaf stripper based on aspiration of the leaves with a turbine trough, a fixed grid, placed in front of the blades of the latter. The sharp blades of the turbine helix are used as means of severing the leaves. This system is well-known and most leaf strippers currently marketed are based on this principle.

These machines require a significant negative pressure to suck the leaves into the severing system made up by the turbine blades. These heavy and bulky machines are not equipped with a positioning system of the leaf stripping turbine in relation to the plant cover. The dexterity of the driver through the accuracy of his driving, necessarily at low speed, ensures the quality of stripping. This principle makes the stripping rate approximate and the injury rate to grape bunches high; the high suction power required for efficient stripping limits the speed of advance of the leaf stripper. The projections of shredded leaf particles and the dust raised by this type of machine are major disadvantages from a health point of view.

In document FR-2,406,384, a vine stripping machine is described that uses the blast of a fan through the plant cover to push the leaves through a grid-type rotating drum installed opposite thereto. The grid-type drum rolls over the plant cover while the leaves pushed by the blower through the rotating drum wall featuring horizontal bands are severed by cutters rotating inside it.

This solution has several disadvantages that probably explain its absence on the market, such as for example:

the difficulty to accurately channel the flow of air blowing through the plant cover, as stems, bunches and posts located between the fan and the cage or drum disturb and deviate the flow of air, thus preventing the leaves from entering the facing cage;

as described and drawn in document FR 2,406,384, the rotating cage that severs the leaves is mounted on the opposite side of the tractor; thus the operator has no visibility on the stripped area and this heavy and bulky architecture is thus inappropriate for this operation that requires continuous monitoring of the rate of leaves removed and of potential injuries to the grape bunches; and finally, no device is provided for the discharge of the leaves cut inside in the cage and therefore rapid plugging can be expected due to the accumulation of cuttings inside the drum.

Document EP-0,597,253 describes very summarily an automatic vine leaf stripper comprising a foliage suction system using a centrifugal aspirator and a linear suction port, a leaf severing device with a reciprocating cutting blade placed close to said linear suction port, a roller installed in front of the suction system to be able to separate the leaves from the grape bunches and a conveyor belt placed in front of the stripping head whose moving speed is synchronized with the moving speed of the leaf stripper. This conveyor belt makes it possible to bear on the plant cover without causing any friction onto the grape bunches.

However, the leaf strippers currently marketed based on the arrangements described in that document are not equipped with the conveyor belt whose presence is the cause of disadvantages in view of which the result strived for seems secondary. In fact, the action of the belt upstream of the stripping head channels and probably pushes back leaves and bunches, but the belt stops in front of the suction port. When this vegetation passes in front of the suction port where the cutter blade is located, the belt no longer operates. The presence of this belt in front of the plant suction and severing system thus loses all efficiency with regard to the separation of leaves and bunches.

To separate the leaves from the bunches, a vertical roller is installed in the front of the suction and cutting system, between the conveyor belt and said system but after this roller goes by, nothing prevents the bunches from being sucked with the leaves and severed at the same time as said leaves.

In addition, the cutter bars with a reciprocating blade cause a relatively significant percentage of injuries to the bunches, especially with an assembly of the kind described in document EP-0,597,253.

In document EP-0,898,877, a vine leaf stripping device is described that uses the known principle of attracting the leaves with a suction port and severing them with a reciprocating blade. The originality of this device would lie in its capability to automatically position the stripping head in relation to the plant cover according to two planes through two electric sensors bearing on the row of vine, with one sensor controlling a hydraulic jack that adjusts the stripping depth, and the other sensor controlling a jack that tilts the stripping head to match the profile of the plant cover.

This principle of circling around the plant cover is interesting in theory; however, it has a few disadvantages, especially those related to the machine swings and plant cover unevenness that require inopportune and sudden changes of positions of the leaf stripping head. Because of the response times of the controls and the inertia generated by rapid changes of positions of the stripping head, such stripper is not suitable for bumpy terrains and can advance only at low speed. Its design is heavy and complex. In addition, for a construction of the type that is described in document EP-0,898,877, the use of a cutter bar comprising a reciprocating blade is likely to cause a not insignificant number of injuries to the grape bunches.

BRIEF SUMMARY OF THE INVENTION

The purpose of the invention is among other things to eliminate the significant disadvantages of the strippers described in the prior art documents and/or currently available on the market.

To that effect, a machine was selected that comprises a leaf stripping device with a grid-type rotating drum, a suction means that permits to generate a suction air flow running through the perforated cylindrical side wall of said drum, and means to channel this air flow through a changing portion of said side wall.

According to that leaf suction principle through direct contact with the plant cover, it appears that the negative pressure flow necessary to snap and blow the leaves against the grid-type side wall of the rotating drum can be relatively small compared to conventional leaf strippers that stay relatively far from the plant cover, which requires a very high negative pressure and therefore a lot of power to draw the leaves into the stripping system.

According to a first characteristic arrangement of the invention, the actual leaf stripping system consists of a cutting means installed close to the suction portion of the side wall of the rotating drum and oriented parallel or roughly parallel to the axis of rotation of the latter.

Under another very important characteristic arrangement of the invention, the cutting means is arranged behind a diametrical plane of the rotating drum oriented perpendicular to the forward direction of the machine during operation.

Through the above characteristic arrangements, the machine is capable of performing a leaf stripping of a quality comparable to a trimming of the plant cover as the leaf stalks are cut and not shredded, contrary to the solutions previously proposed that remove the leaves by tearing them off using propellers or cutters or jam rollers.

After their stems are severed, the leaves remain stuck against the perforated side wall of the rotating drum and are driven out of the field of suction through the rotation of said wall. When the portion of the side wall plastered with cut leaves becomes isolated from the suction field by the suction flow deflector, the leaves, that are no longer subject to the air flow draw, fall by gravity. This result is another advantage as it eliminates the projections of shredded leaves likely to cause potential diseases due to the particles and dust propelled by the turbine blast onto the neighboring vine rows.

Under another characteristic arrangement of the invention, the stripping head or each head of the stripper comprises a guide track consisting of a grid-type endless belt wrapping, on one hand around the rotating suction drum, and, on the other hand, around a second drum installed in front of said suction drum, said perforated endless belt having on the side of the stripping head designed to be facing the plant cover during operation, a straight course, parallel to the axis of forward movement of the stripper so as to present a plane bearing surface.

The function of the perforated track thus made is to ensure proper guiding and stability of the stripping head on the plant cover. It provides a flexible bearing of the stripping head on the plant cover while avoiding the latter to be crushed because of its large contact surface.

According to a very important characteristic of the invention, the cutting means for the stripping head or for each stripping head consists of a helical cutter bar comprising, on one hand, a cutter screw consisting of a rotating cylindrical rod provided with a helical thread, featuring a cutting edge, and, on the other hand, a back blade consisting of a fixed cylindrical sleeve open laterally and inside which said cutting screw is housed, said sleeve being provided with spaced curved fingers forming as many back blades designed to cut off the leaf stalks and push back the grape bunches by preventing them from penetrating into the spaces bounded by said superposed fingers.

The main advantage of this helical cutter bar is, if not to totally eliminate every risk of injury to the bunches, at least to minimize the percentage of such injuries.

According to another embodiment of the invention, a cutting means is installed vertically in front of the stripping device and at a distance from it; this cutting means may consist of a reciprocating cutter bar or a similar device. This cutter bar is designed to trim the vine row over its total height so as to cut all leaves and stems the furthest from the fruit-bearing area. It is used to do a first rough cut: it trims down the plant cover in order to reduce the volume of leaves to be removed by the actual leaf stripping device.

BRIEF DESCRIPTION OF THE SEVERAL VIEWS OF THE DRAWINGS

The above purposes, characteristics and advantages, and others, will become more evident from the description that follows and from the attached drawings.

FIG. 3 is a plan view front view of one of the stripping heads or modules of said stripper and its suspension device.

FIG. 4 is a side view along arrow F1 in FIG. 3.

FIG. 5 is a front view, at a larger scale and with partial cross-sections view of a stripping head.

FIG. 12 is a front view of the deflector housed in a fixed manner in the rotating drum of the leaf stripping device.

FIG. 13 is a side view of this deflector.

FIG. 14 is a top view of FIG. 12.

FIG. 18 is a plan view of FIG. 17.

FIG. 19 is an axial sectional view of the leaf stripper assembly.

FIG. 20 is an elevation view of the cutting screw on the helical cutter bar.

FIG. 21 is an axial sectional view of this cutting screw.

FIG. 22 is an elevation view of the counter-blade on the helical cutter bar.

FIGS. 23 through 25 are sectional views along lines A—A, B—B and C—C from FIG. 22, respectively.

FIG. 26 is an elevation view of the helical cutter bar.

FIG. 27 is a sectional view along line A—A from FIG. 26.

FIG. 28 is a sectional view illustrating the severing of a leaf stalk by the helical cutter bar in sequence.

DETAILED DESCRIPTION OF THE INVENTION

Figure 1:
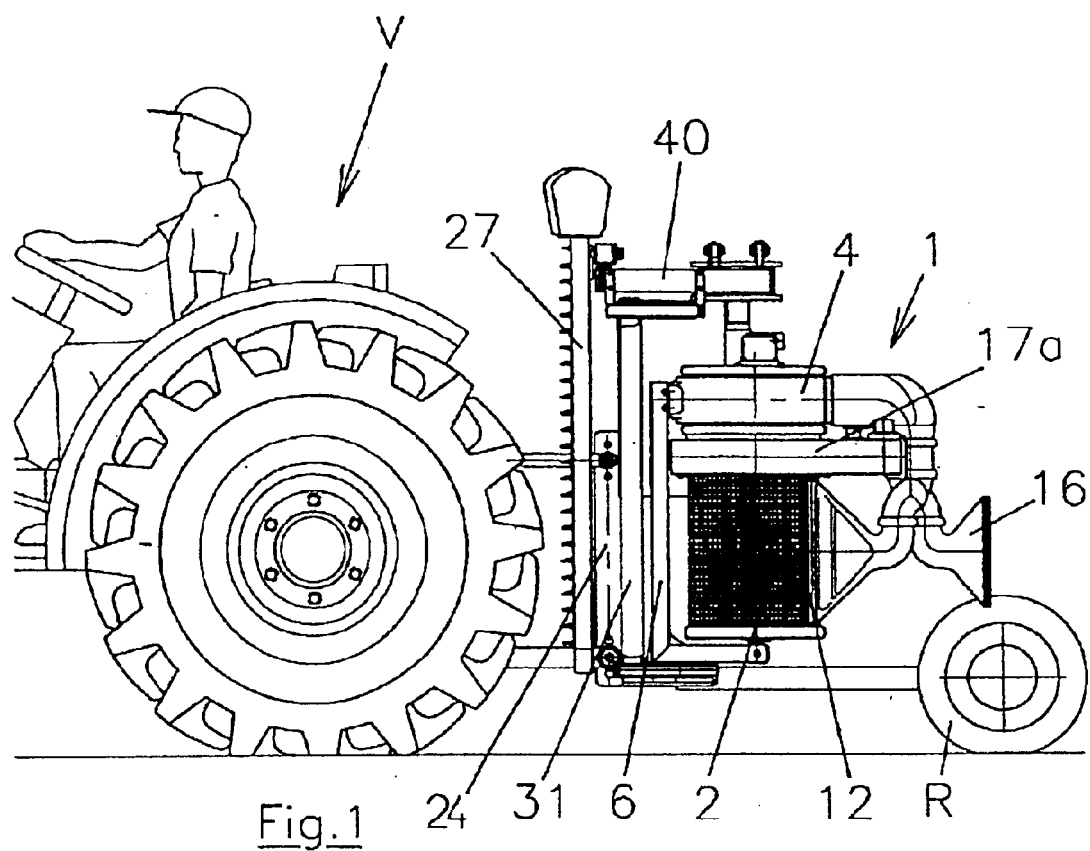
FIG. 1 is plan view of a first example of embodiment of a leaf stripper under the invention, shown hitched to the back of a conventional farm tractor.
Figure 2:
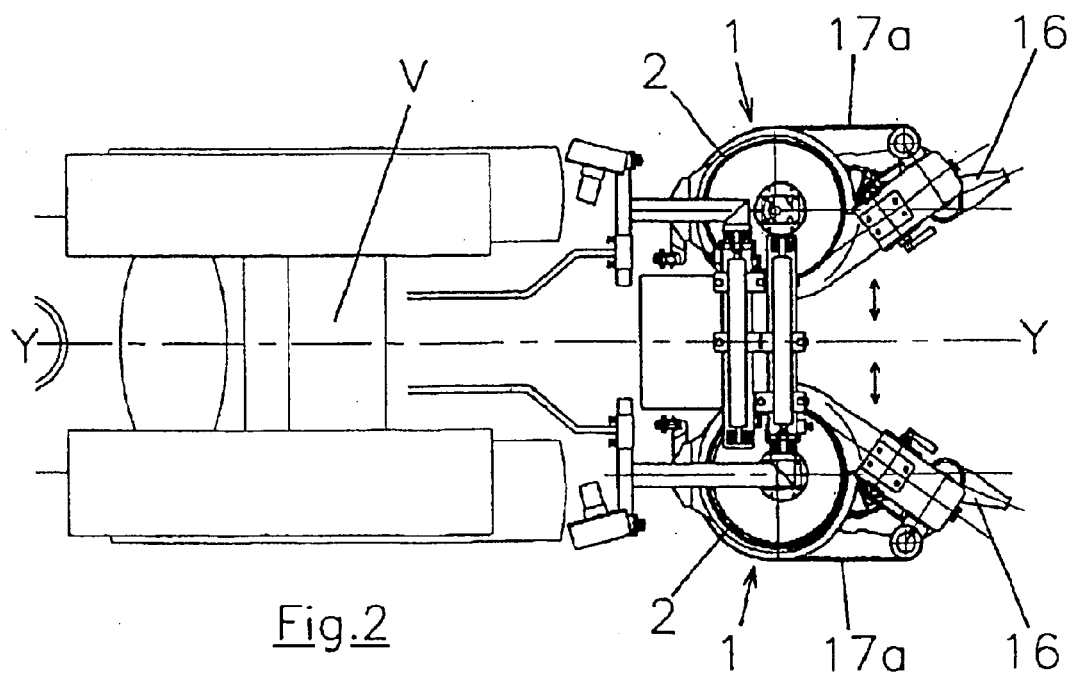
FIG. 2 is a plan view of FIG. 1, showing the stripper with two symmetrical stripping heads.
Figure 6:
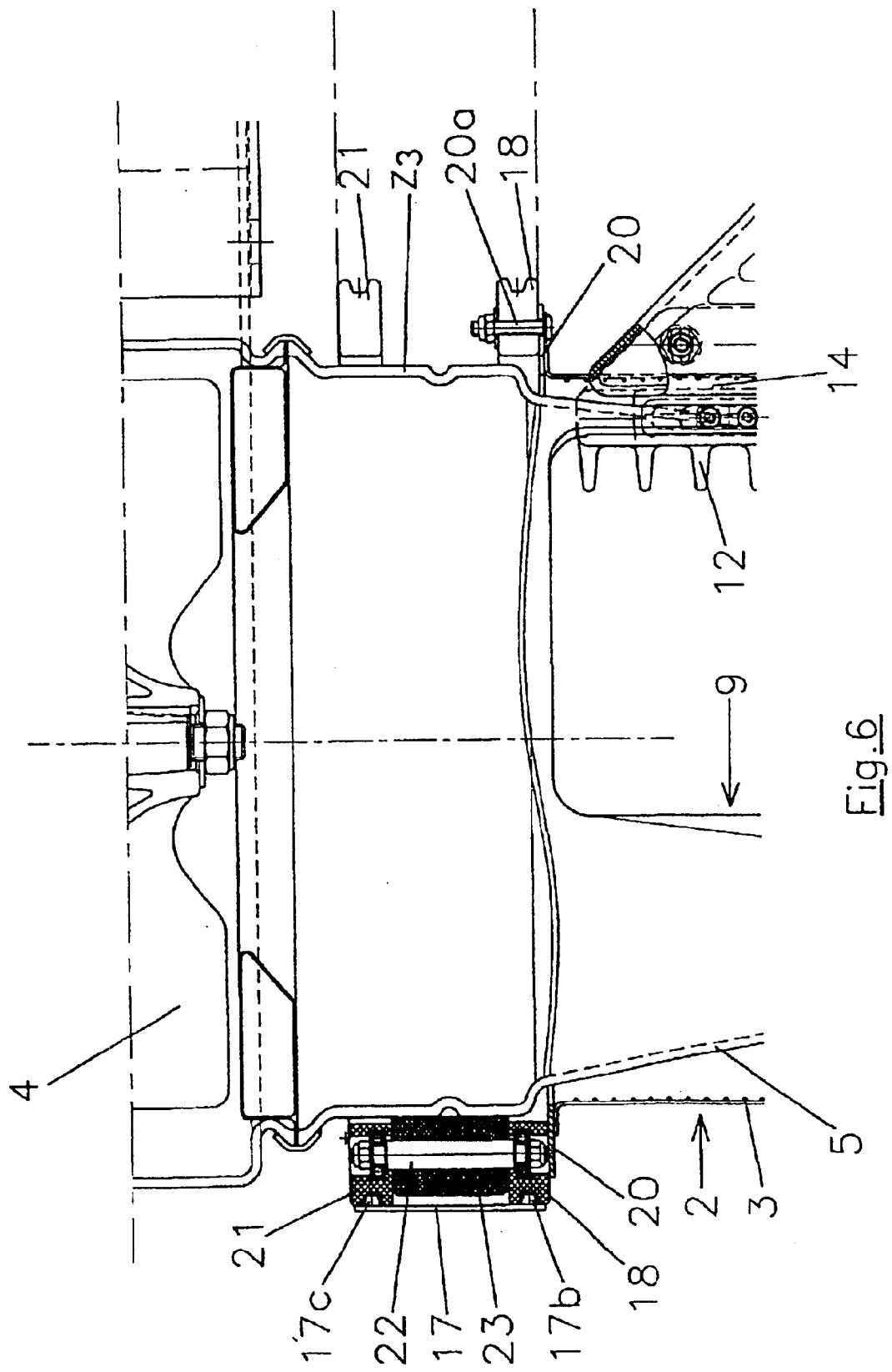
FIG. 6 is a detail view per a diametrical cross-section and at a larger scale, showing the means of rotary drive of the grid-type rotating drum.

Reference is made to said drawings to describe two advantageous, although in no way limiting, examples of embodiment of the leaf stripper under the invention.

Although in the remainder of this description, reference is made only to the use of that leaf stripper to perform selective leaf stripping of the vine, it is obvious that such use is not limiting and that this machine could be used to perform leaf stripping on other plants grown in the form of lined-up shrubs.

This leaf stripper comprises at least one stripping head 1 with a rotating suction drum 2 consisting of a grid-type cylindrical wall 3 with a mesh comparable to a wire mesh roller.

This grid-type drum can have, for example, a height between 400 mm and 800 mm, depending on the models of strippers and a diameter of approx. 400 mm.

The perforated side wall or cylindrical grid of the drum can be achieved using a perforated plate or braided metallic fabric, e.g., twill weave wires with a cross-section of approx. 2 mm, making up a grid where the size of the mesh with a square cross-section is, for example, approx. 8 mm×8 mm. The cross-section of the openings or mesh of the grid-type cylindrical wall is defined so as to make it possible to blow the leaves to be removed against the perforated side wall of the drum through suction while preventing grape pips and other cutting debris from entering said drum.

A suction turbine, for example consisting of a centrifugal aspirator 4 actuated by a hydraulic motor M2, is installed above drum 2 to create inside said drum a negative pressure that generates a suction flow running through the perforated side wall of said drum, causing the leaves from the plant cover to "stick" to said perforated side wall or grid of the drum. It is to be noted that the air of the suction flow generated by the turbine to snap the leaves remains clean as the drum grid acts as a filter so that the air blown by said turbine can be used for interesting additional functions, as explained herein below for the embodiment illustrated in FIGS. 1 through 14.

Inside the grid-type drum 2, is housed in a fixed manner close to the cylindrical grid 3 of said drum 2, a deflector 5 that may consist of a part made of rotomolded plastic or another material, whose shape is determined so as to optimize the efficiency of the suction system. Said deflector 5 that has a side wall 5a and a bottom 5b through which it is rigidly connected to a lower horizontal element 6a of frame 6 of the stripping head, for example, through a fastening component 7 running through an axial opening provided in the bottom 8 of the rotating drum and acting as a pivot for the latter. This fastening system has the advantage of not plugging the turbine 4 inlet located above said deflector.

An opening 9 is provided in the side wall 5a of the latter. This opening, for example, extends over a height roughly equal to the height of grid 3 on the rotating drum and has a width of approx. 220 mm to 260 mm corresponding to an arc of approx. 70° to 80°.

Figure 7:
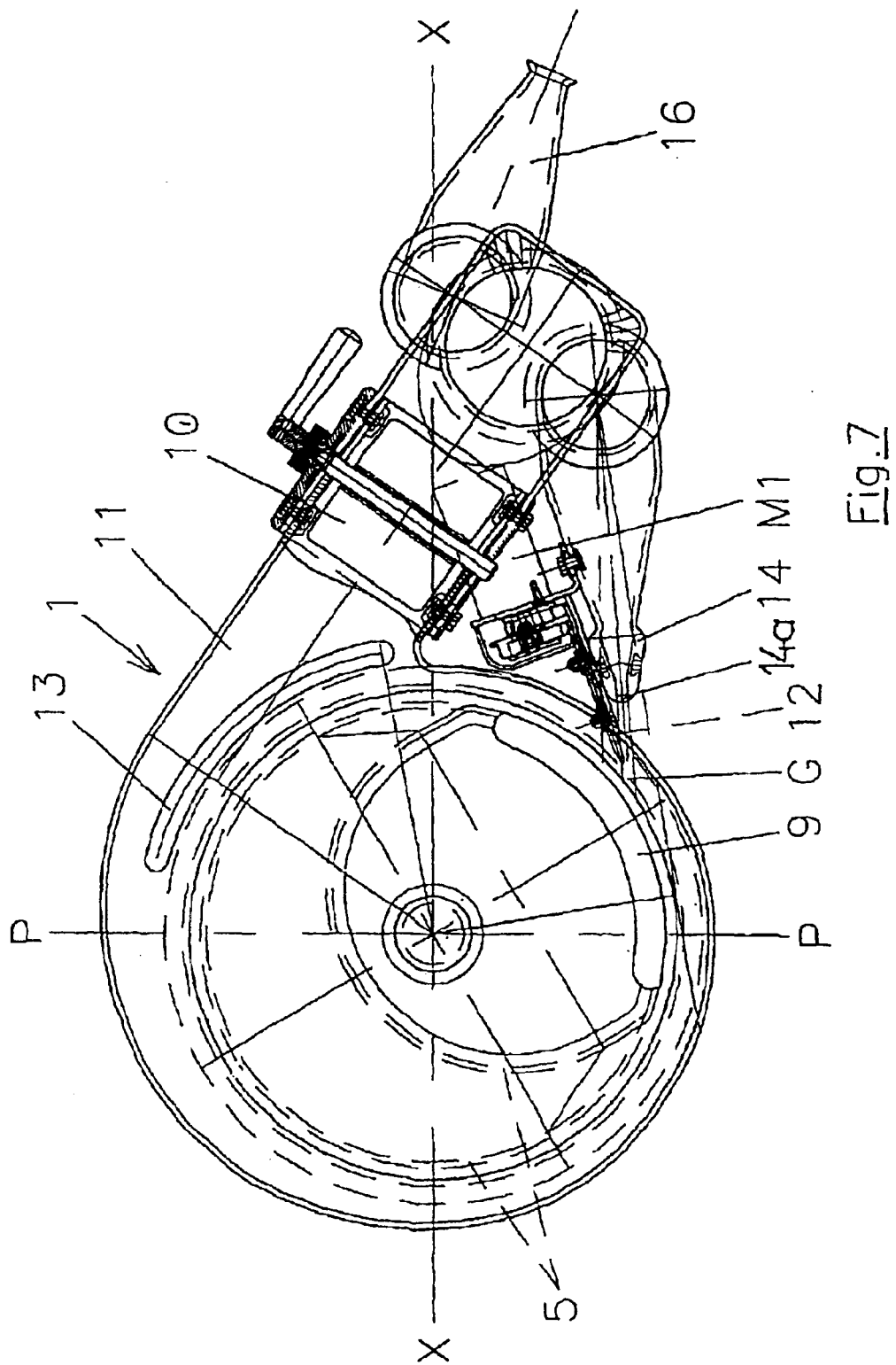
FIG. 7 is a plan view of the stripping head, shown without the upper guide track.

The major part of the area corresponding to the width of the opening 9 is located behind a diametrical plane P-P of the grid-type rotating drum 2 perpendicular to the axis of advance X-X of the stripping head 1 during operation (FIG. 7).

The opening 9 of the deflector 5 is located close to the cylindrical grid 3 of the rotating drum 2 so that said deflector, on one hand, ensures tightness over a major part of the circumference of the perforated drum, and on the other hand, carries the aspirated air inside said drum through opening 9. It is understood that the inlet air of turbine 4 is conducted in the form of a suction flow running through a changing portion of said rotating cylindrical grid, with the location and dimensions of this grid portion matching those of said opening.

The opening 9 and the portion of grid that lies in front of it thus make up a suction port arranged in an area of the drum designed to be in contact with the plant cover of the vine row.

According to this principle of leaf suction through direct contact with the plant cover, it appears that the negative pressure flow required to snap and blow the leaves against the cage grid can be relatively low compared to the conventional leaf strippers that remain relatively far from the plant cover, which requires a very significant negative pressure, thus great power to suck the leaves into the cutting system.

The fixed deflector 5 has, laterally, a cylindrical shape in area Z1 where the suction port 9 is provided so that this portion or area Z1 of the side wall of said deflector and the wall 3 of the rotating cylindrical drum 2 are concentric. The deflector has a conical shape in the area or remaining portion Z2 of its circumference, over a height matching that of area Z1. The conical area Z2 widens upward, with the small base of this conical area connecting to the bottom 5b of the deflector. The large base of the conical portion Z2 and the upper edge of the cylindrical portion Z1 connect to a cylindrical upper portion Z3 connecting itself to casing 28 of the suction turbine 4.

This progressive section of the deflector 5 from the base upward permits to increase the velocity of the inlet air in the lower part of said deflector. The section gradually increases upward to slow down the air velocity in the area close to the turbine 4. The conical shape of the deflector permits to balance the negative pressure over the whole surface or extent of the suction port made by opening 9.

In the principle of the contact rotating cage, the intensity of the leaf stripping is proportional to the negative pressure generated by the aspirator. The volume of leaves removed can thus be adjusted based on the fan suction power. Such control of the suction power can be achieved either by adjusting the rotating speed of the turbine, or by slowing down the air output of the turbine through an adjustable shutter or door 10 arranged on the exhaust pipe 11 at the volute outlet.

Through suction, the leaves are stuck onto the cylindrical grid of the rotating drum. Under the combined effect of pneumatic suction and mechanical rotation of the drum, the leaves are pulled from the plant cover. The leaves that are lighter than the grape bunches, also have a larger suction surface area so that a relatively small negative pressure, through differential density, is sufficient to "glue" the leaves against the grid of the rotating drum without sucking the bunches.

A cutting means is installed close to the suction port 9 of the rotating drum, parallel or roughly parallel to the axis of rotation of the latter.

In a very advantageous manner, this cutting means is arranged in the back (considering the forward direction of the machine) of a diametrical plane P-P of the drum oriented perpendicular to the axis of advance X-X of the stripping head 1 of the leaf stripper, during operation, or in other words, behind tangent T issuing from a radius of the drum perpendicular to the vine row. It extends preferably over the whole height of the perforated side wall crossed by the inlet flow.

The cutting means may consist of a reciprocating cutter bar 12 (embodiment according to FIGS. 1 trough 14) actuated by a hydraulic motor M1 coupled to a known eccentric transmission system, whose blades arranged slightly back in relation to a generatrix G of the cylindrical grid 3 on rotating drum 2 cut off the stalks of the leaves blown against it.

The cutting means could also consist of a band saw with small teeth, turning at high speed, or of superposed rotating knives, or of circular cutter bars (moving blades attached onto an endless belt), etc.

However, in a preferred and advantageous manner, the cutting means consists of a helical cutter bar, as described hereinafter (embodiment according to FIGS. 15 through 35).

In addition to the above-mentioned advantages of such cutting device, it is to be stressed that the cutting quality of the bars containing a system of blades and back blades is constant and insensitive to the fouling phenomenons caused by sap, which is not the case of high speed rotating systems that, in addition to problems of cut quality (shredded leaves, peeled-off stems), create safety problems due to the vibrations of the mechanical components and projections of cuttings.

The cutter bar 12 is oriented tangentially to the rotating drum and it can be supported by known means making it possible to adjust its tangential positioning in relation to said drum.

Preferably, the cutter bar is arranged and oriented so that:
the ends of its blades are placed approx. 10 mm from the cylindrical grid of the drum;
the ends of the blades are laterally recessed in relation to the generatrix of the drum in contact with the plant cover during operation over a distance of approx. 50 mm; and
it forms an angle of approx. 20° in relation to the axis of the vine row during operation.

As indicated above, the leaves, after being severed from their stalks with the cutting means 12, are driven outside of the suction field due to the rotation of drum 2 and fall on the ground by gravity.

In order to promote the unsticking and discharge of the cut-off leaves, at least part of the air blasted by the suction turbine can be drawn and blown in the form of an air curtain, preferably with a downward direction, against a portion of the cylindrical grid 3 of the suction flow-tight rotating drum 2.

To that effect, the leaf stripper can comprise means making it possible to draw at least part of the air blasted by the suction turbine and to discharge it in the form of an air curtain; under the example shown in FIGS. 1 through 14, the turbine discharge connects with a discharge scroll 11 whose bottom features a port in the shape of an arc of circle 13.

The discharge of the suction turbine 4 can connect with a pneumatic comb 14 using at least part of the air blasted by said turbine, the air drawn at the outlet of said turbine being conducted and blown through a slot or air diffuser 14*a* on said pneumatic comb located close to the cutting means, over a height matching roughly the height of the active part of the latter. The air curtain blown level with the bar or other cutting means 12 is directed tangentially against the grid-type side wall 3 of the rotating drum and acts as a pneumatic separator. The air curtain is oriented according to an angle that favors the distancing of the grape bunches by deviating them from the bar or other cutting means.

The pneumatic comb 14 is connected to the discharge pipe 11 on suction turbine 4 through a duct 15.

The discharge of suction turbine 4 can connect with a phytosanitary agent spraying module using as airborne carrier at least part of the air blasted by said turbine. This spraying module includes a pneumatic diffuser 16 arranged behind the leaf stripping system (considering the forward direction of the machine). The air flow necessary for the pneumatic diffuser 16 to operate is led through the duct 15.

Whenever the leaf stripper comprises both a pneumatic comb 14 and a pneumatic diffuser 16, the flow of air drawn from the suction turbine outlet is led to them through bypass pipe 15*a*, 15*b*, respectively, connected to the downstream end of duct 15.

The phytosanitary mixture is, for example, led from a small tank attached in the back of the leaf stripper chassis to the pneumatic diffuser using a pump (not represented). This pump can be driven either electrically, or hydraulically, or directly through the tractor power take-off.

A control system arranged in the air supply channel of the pneumatic diffuser 16 permits to adjust the volume of air required for the treatment, with any potential excess discharged through a vertical exhaust so as not to generate any dust. This control system can consist of an adjustable door 10, as described above.

The stripping head or each stripping head of the leaf stripper comprises a guide track consisting of a flat endless belt 17 with for example a width of 100 mm, wrapping, on one hand, around a large grooved pulley 18 rigidly integral with the upper part of the grid-type rotating drum 2, and, on the other hand, around at least one vertical-axis roller 19. This flat endless belt is arranged so that it has on the side of the stripping head designed to be facing the plant cover during operation, a straight portion 17*a*, parallel or roughly parallel to the axis of advance of the stripper. This straight portion makes up a bearing and guiding pad that moves forward while being constantly applied against the plant cover made of the vine row leaves, in spite of the uneven surface of said plant cover.

The grooved pulley 18 is attached on a crown 20 made rigidly integral with the upper part of drum 2, with bolts 20*a* spread over the periphery of said pulley and crown.

Figure 8:
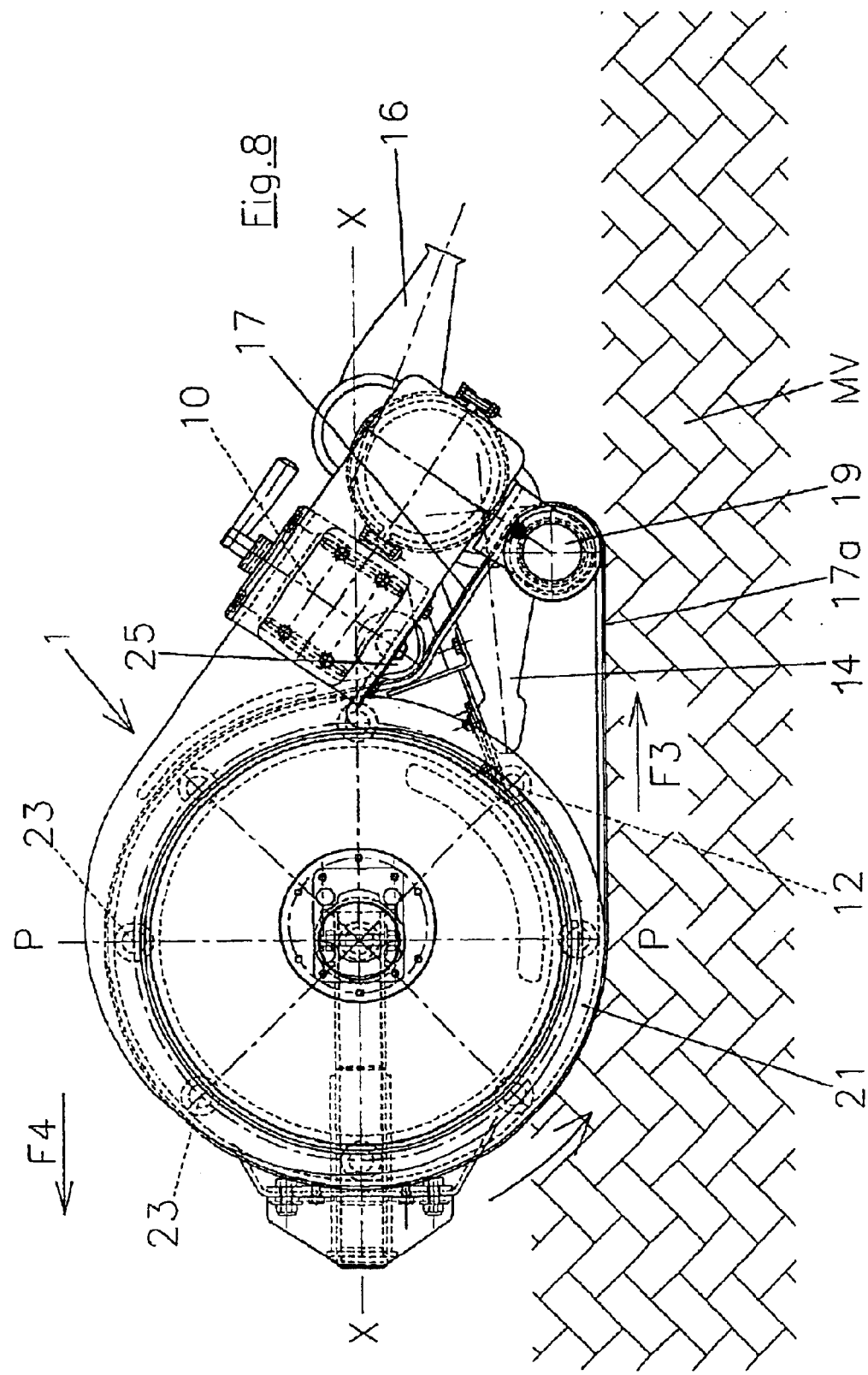
FIG. 8 is a plan view showing the stripping head with its support track during operation.
Figure 9:
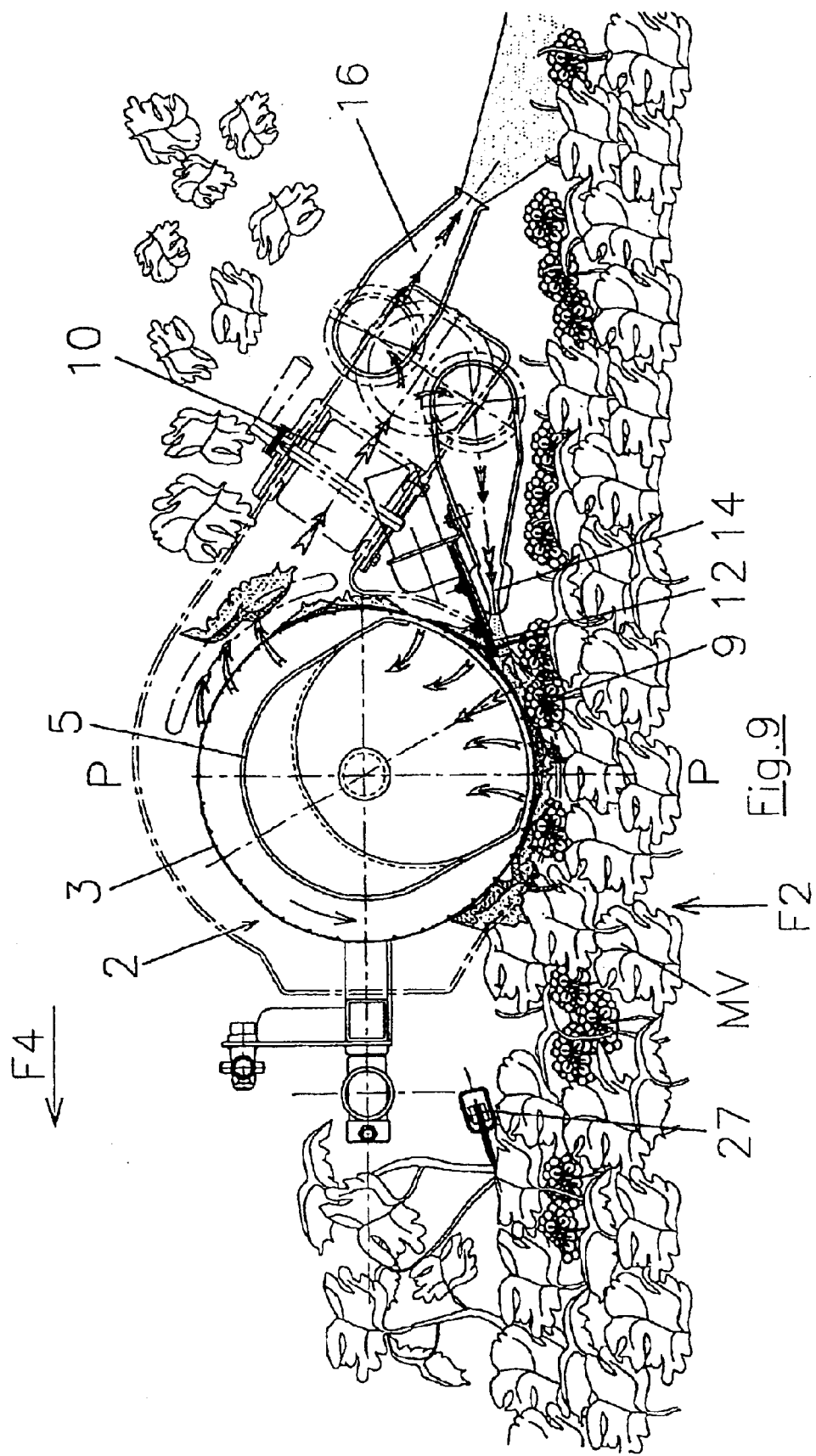
FIG. 9 is a plan view illustrating the work performed by the leaf stripper.
Figure 10:
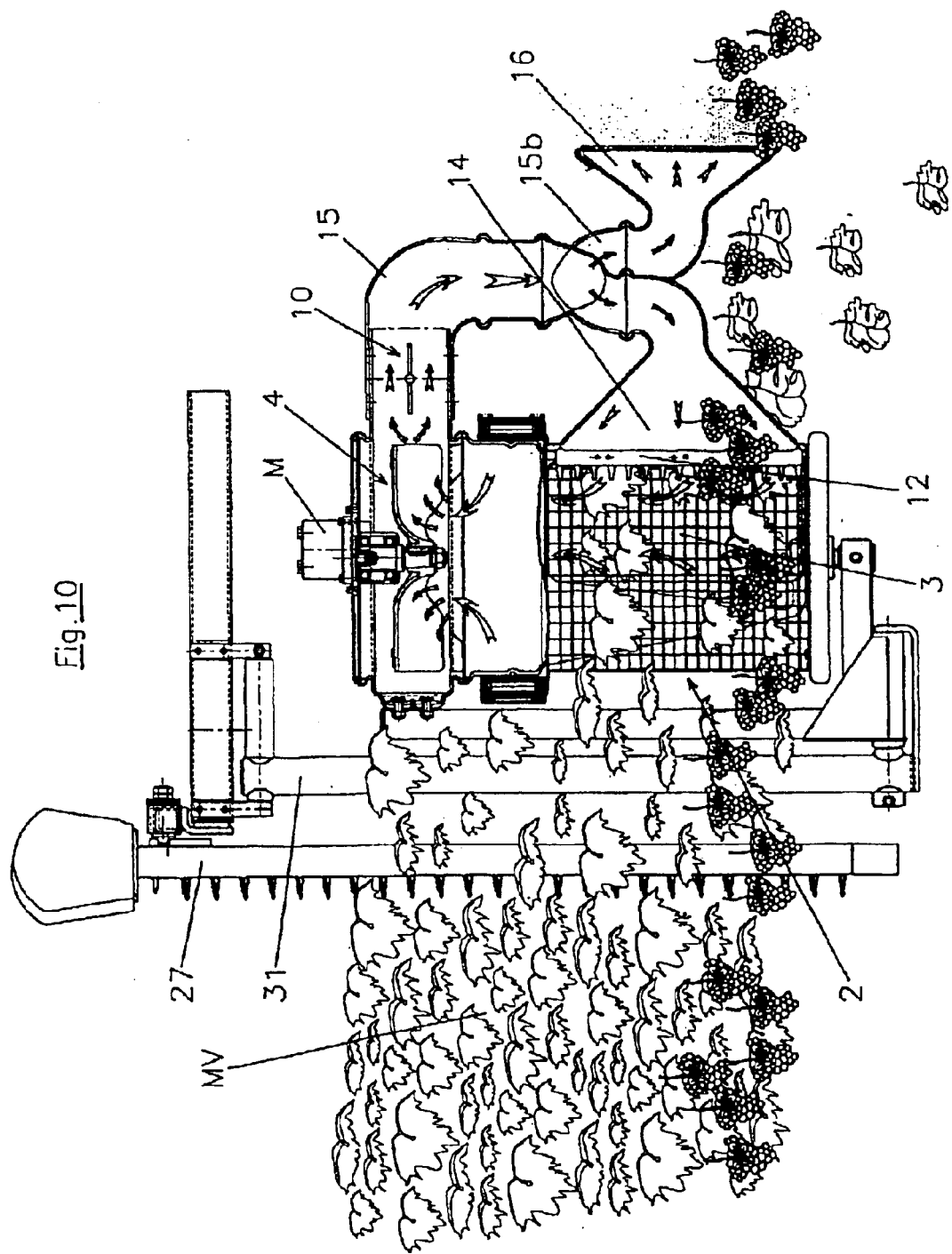
FIG. 10 is a schematic front view per arrow F2 on FIG. 9.

Above grooved pulley 18, a second large grooved pulley 21 connected to pulley 18 through vertical axes 22 of guide rollers 23, for example 45° apart (FIG. 8).

The inside face of the endless belt 17 is equipped with two spaced-out parallel V-belts 17*b*, 17*c* respectively housed in the grooves of the lower 18 and upper 21 pulleys.

It is to be noted that pulleys 18 and 21 over which the flat endless band winds has a diameter (for example, of approx. 500 mm) greater than the diameter of the grid-type drum 2.

It is understood that pulleys 18 and 21, shafts 22 and rollers 23 form an assembly integral in rotation with the grid-type drum 2 and turning around the upper cylindrical portion 23 of the fixed deflector 5, said rollers 23 making up the rolling and guiding components of the rotating assembly.

The driving of this assembly in rotation is provided by the endless belt 17 itself driven by the motor roll 19. A hydraulic motor M3 buried in roller 19 provides for the rotating drive of the latter. A tension roll 25 can be arranged in the back of the rotating drum to allow for an adjustment of the tension of the flat belt or track 17.

The track 17 moves at a speed equal to the moving speed of the leaf stripper so that the rotating drum is driven in rotation at a speed equal to said moving speed. In its portion designed to bear on the plant cover MV, the track moves in a direction (arrow F3) opposite to the direction of forward movement (arrow F4) of the leaf stripper, thus resulting in zero relative speed between the plant cover and the track (FIG. 8).

Through its winding diameter greater than that of the grid-type drum 2, the upper track 17 makes it possible to maintain an offset of approx. 40 to 50 mm between the bearing surface 17*a* of said track and the cylindrical wall of the rotating cage, which permits to limit the contact pressure of the stripping head on the fruit-bearing area.

The purpose of a slight pressure applied trough contact of the track and the rotating cage on the row of vine to be stripped is to straighten up the plant cover so that the vines can be properly stripped of their leaves even if they are poorly tied, a result impossible to achieve with the conventional leaf strippers.

A wheel 26 with a diameter greater than the diameter of the grid-type drum 2 is arranged at the lower part of said drum, such wheel acting as a bumper protecting the latter and the vine.

In an advantageous manner, a cutter bar 27 or other known means of cutting, such as a reciprocating cutter bar, is arranged vertically in front of the rotating drum of the stripping head or of each stripping head, or in front of each leaf stripping module in the second embodiment of the leaf stripper, as described below. This cutter bar 27 carried by an element 24 of the stripper frame is arranged at sufficient distance from the rotating grid-type drum 2 or from the leaf stripping module described below so that the cuttings do not hinder the operation of the stripper. Means of manual adjustment can be provided to have the capability of adjusting the cutting depth so as to complete the position of the cutter bar 27 in relation of the fruit-bearing area.

The stripping head or each stripping head 1 of the leaf stripper is carried by a L-shaped frame 6 consisting of a horizontal lower element 6*a* supporting pin 7 of the rotating drum and a post 6*b* whose upper part is attached rigidly, for example, with screws, to the casing 28 of the suction turbine 4.

The leaf stripper also comprises:
  on one hand, means to move its stripping head 1 or each one of its stripping heads 1 further from or closer to its forward axis Y-Y, and/or
  on the other hand, means to adjust the position of the stripper drum in relation to the vertical.

The frame 6 is mounted, through its lower horizontal element 6*a* and a sleeve 30 integral with said element, on one of the lower horizontal axes 29 of a bearing structure, consisting advantageously of a rocker arm with a vertical deformable parallelogram. This rocker arm comprises a beam 31 of a height greater than that of the stripping head, a turnbuckle type tie rod 32, a suspension means 33 shaped so as to make up the small fixed side of the deformable parallelogram, and a positioning rod 34 also integral with the sleeve and making up the other mobile small side of said parallelogram. This device allows for a lateral pendulum movement of the stripping head with limited amplitude, for example approx. +/−300 mm.

The tie rod 32 of that rocker arm with a deformable parallelogram is preferably equipped with known center-to-center adjustment means, permitting to change its length and therefore the position of the stripping head which can be tilted in the vertical plane by +/−20°.

In an advantageous manner, the structure bearing the stripping head or each stripping head comprises an elastic support device designed to maintain drum 2 in constant pressure and flexibility on the plant cover MV. This device consists, for example, of a gas spring 35, attached through its opposite ends and hinges, on one hand, to a fixing lug 36 integral with post 31 of the deformable parallelogram, and, on the other hand, to a piece integral with the upper part of the leaf stripper chassis, this piece consisting for example of the small fixed side 33 of said deformable parallelogram (FIG. 11).

Preferably, means permit to manually adjust the pressure of this gas spring or similar device.

The upper part of the spring 35 is, for example, equipped with a pin 37 that fits into a rack 38 rigidly integral with the upper part of the leaf stripper chassis.

Figure 11:
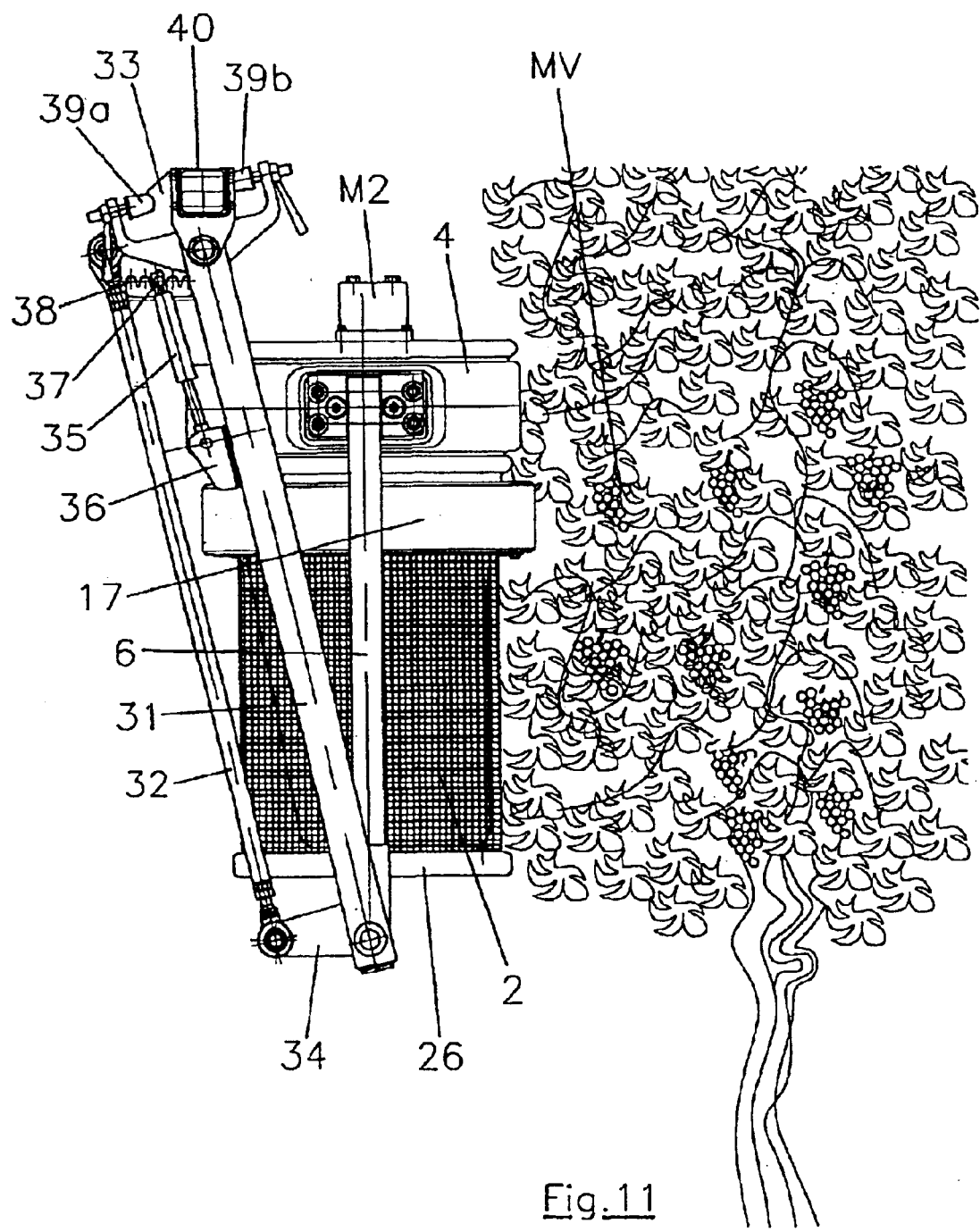
FIG. 11 is a frontal view of a stripping head and its carrying frame.
Figure 15:
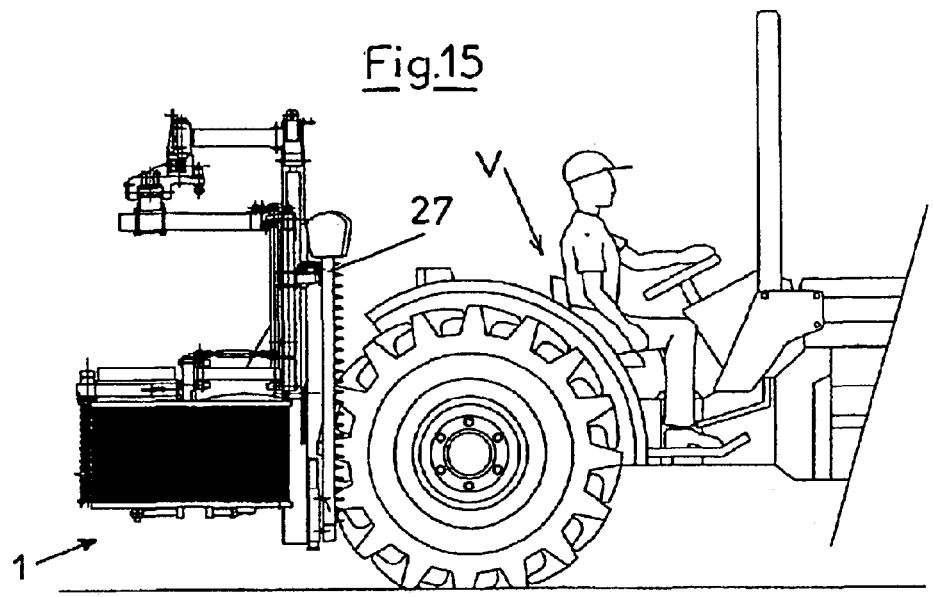
FIG. 15 is a side plan view of a second especially advantageous and performing example of embodiment of the leaf stripper under the invention, shown installed in the rear of a conventional farm tractor.
Figure 16:
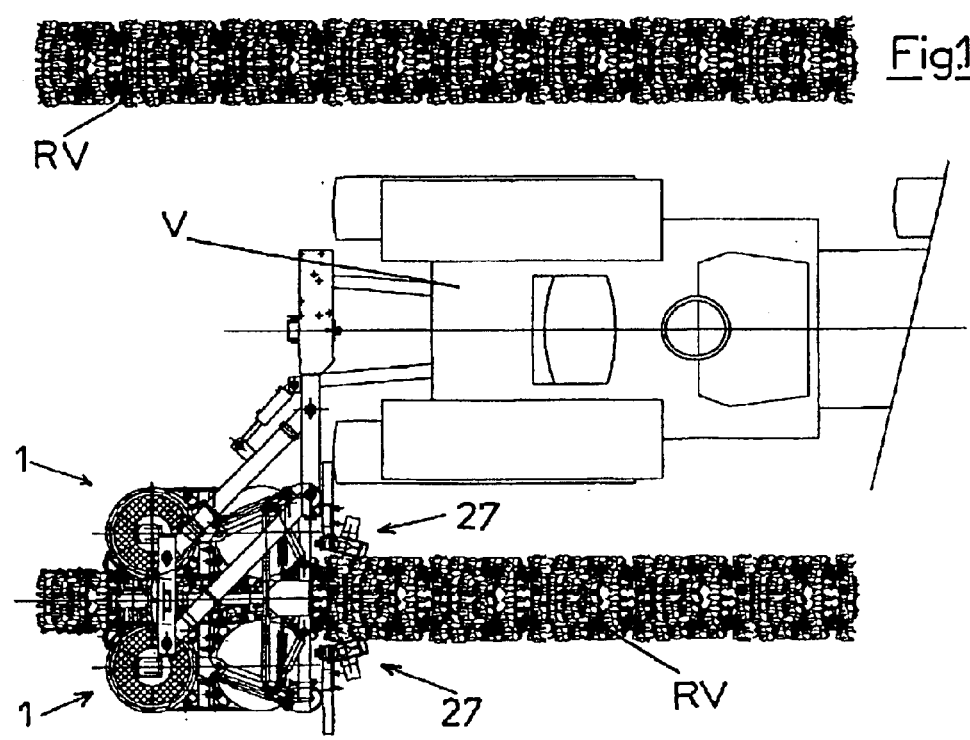
FIG. 16 is a plan view of FIG. 15, showing the leaf stripper during operation, centered on a vine row.
Figure 17:
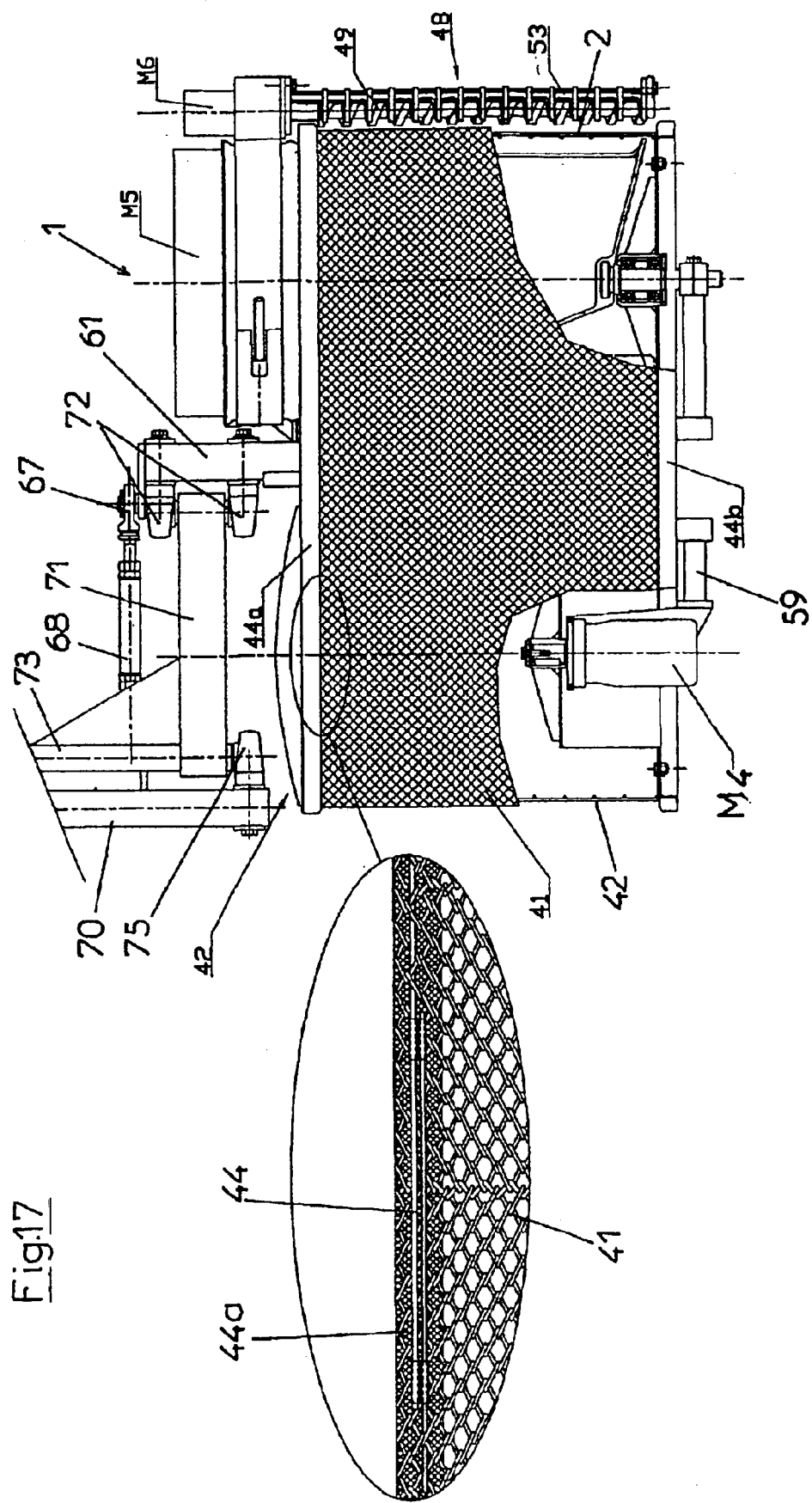
FIG. 17 is an elevation view of a stripping head constructed according to the second example of embodiment of the invention.
Figure 29:
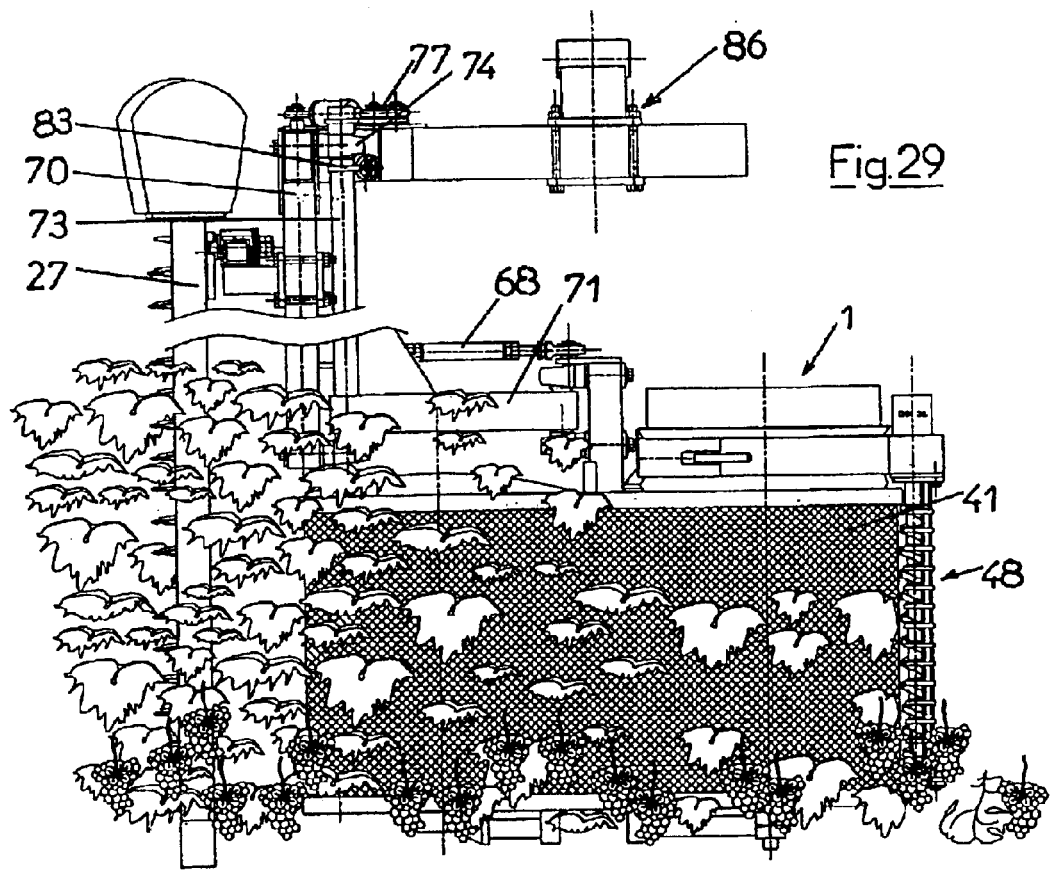
FIG. 29 is a front view of the leaf stripper, represented during operation.
Figure 30:
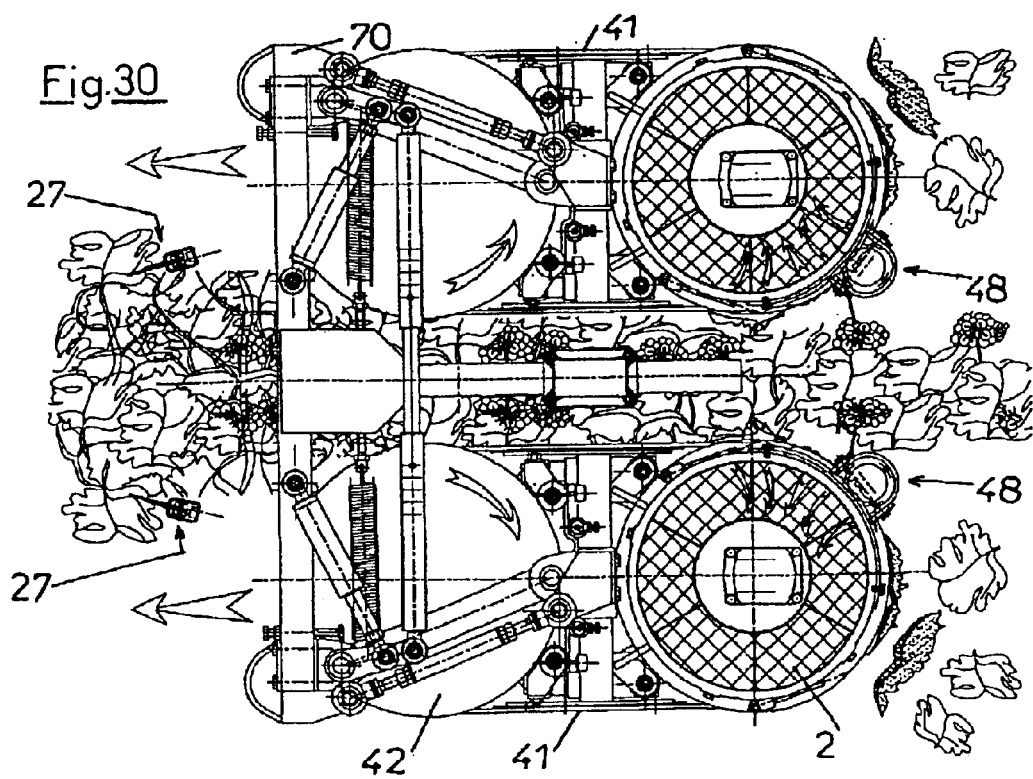
FIG. 30 is a plan view of FIG. 29.

Two stops 39a, 39b arranged on either side of the upper part of the parallelogram rocker arm permit to adjust the positions and the transverse travel of the stripping head, these stops resting against an element of the upper part of the leaf stripper chassis (FIG. 11).

The rocker bar with a deformable parallelogram 31-32-33-34 bearing the stripping head hangs from a horizontal upper beam 40 on the leaf stripper chassis.

The leaf stripper under the invention can be of the "carried" type and its chassis designed so that it can be attached in the front or the back of a vehicle V consisting for example of a farm tractor, or of the towed type and equipped with wheels R and designed so that it can be hitched in the back of a tractor, or installed on various self-propelled vehicles. It may comprise:

- one single stripping head arranged laterally in relation to the axis of advance of the vehicle in order to allow for leaf stripping of a vine row on only one side at a time; or,
- two stripping heads arranged on either side of the axis of advance of a "between-rows" type vehicle, while these stripping heads can be operated:
- either in turns, during round trips of the leaf stripper, if one wishes to strip only one side of the vine rows;
- or simultaneously if one wishes to strip facing sides of two adjacent vine rows;
- two stripping heads arranged on either side of the axis of advance of a "straddling" type vehicle, while these stripping heads can be operated as described above:
- either in turns, during round trips of the leaf stripper, if one wishes to strip only one side of the vine rows; or simultaneously to strip both sides of a vine row straddled by said leaf stripper.

FIGS. 15 through 35 illustrate an especially interesting and performing second example of implementation of the invention.

Under that embodiment and according to a major characteristic arrangement of the invention, a grid-type guide track 41 wraps, on one hand, around the suction drum 2, and on the other hand, around a second drum 42 arranged in front of said suction drum and at a distance therefrom.

This guide track 41 consists of a perforated endless belt, for example, made of a known wire lattice with articulated mesh. It extends over a height matching approximately the height of drums 2 and 42.

The lateral surface of drum 42 consists preferably of a grid 43 and this drum is driven in rotation by a motor M4, advantageously made of a hydraulic motor installed below said drum and attached onto a lower element 59 of the chassis bearing the stripping heads.

Thus, the track 41 ensures transmission of the rotating motion of front drum 42 to rear suction drum 2. It also makes it possible to increase the bearing surface of the stripping head on the plant cover, especially on the grape bunches, and this large bearing surface prevents the plant cover, and especially the grape bunches from being crushed.

The track 41 moves at a speed inversely proportional to the traveling speed of the leaf stripper during operation; on the other hand, in its plane portion 41 a designed to bear on the plant cover, the track moves in a direction (arrow F5) opposite to the traveling direction (arrow F5) of the leaf stripper, resulting in a zero relative speed and the absence of friction between the plant cover and the track (FIG. 18).

Drums 2 and 42 can have identical or different diameters.

The upper and lower edges of track 41 are reinforced with a cable 44 and these reinforced edges are buried in a smooth coating 44a, 44b, for example made out of polyurethane or another suitable plastic material so as to make sturdy and smooth edges (not to injure the grape bunches).

Drums 2 and 42 are provided with upper and lower rims, 45a, 45b and 46a, 46b respectively, ensuring the centering and holding in place of the perforated track 41 on said drums. For the remainder, the suction drum 2 is made roughly in the manner described above for the embodiment under FIGS. 1 through 14, but in the case of the embodiment illustrated in FIGS. 15 through 35, suction is achieved by an axial fan 47 installed at the top of said drum and driven by a motor M5, consisting for example of a hydraulic motor. In this case, the air sucked in by the fan is not reused but simply discharged into the environment, which prevents load losses and ensures better suction.

Under another very important characteristic arrangement of the invention, the cutting means consists of a helical cutter bar 48.

This cutter car comprises:

- on one hand, a cutting screw 49 consisting of a rotating cylindrical rod 50 provided with helical thread 51 with at least one cutting edge 52, and
- on the other hand, a back blade 53 consisting of a fixed cylindrical sleeve open laterally and inside which said turning cutting screw is housed.

The upper end 54 of the cutting screw 49 is coupled to the drive shaft of a motor M6, consisting for example of a hydraulic motor, installed above said screw.

In the application to vine leaf stripping, the helical thread 51 can for example have a pitch of approx. 30 to 40 mm and feature a trapezoidal profile so as to contain a lower sharp or cutting edge 52 and an upper sharp or cutting edge 55.

The cutting screw 49 is driven in rotation in a direction making it possible to push down the leaves and in a direction opposite to the forward direction of the track 41 and of the suction roller 2, with said screw and said track turning in that manner "downstream" so as to complete the leaf entrainment action generated by the suction drum 2.

The sleeve making up the back blade 53 comprises a bar 56 provided with curved fingers 57 evenly spaced and spread over its whole height. These curved fingers 57 surround part of the periphery of the cutting screw 49 corresponding to at least half of the cylindrical surface of the latter and they form as many back blades working together with said cutting screw to cut off the leaf stalks.

The curved fingers 57 have an upper cutting edge 57b and this cutting edge is preferably slightly inclined in the direction of the free end of said fingers.

Laterally, the curved fingers 57 have reinforcements 57a oriented outward and designed to move away the fruit bunches that come in contact with the cutter bar.

In a preferred manner, the spacing or pitch of the fingers 57 on back blade 53 is smaller than the pitch of the helical thread on cutting screw 49.

As indicated above, the helical cutter bar 48 is arranged in the back (with regard to the forward direction of the machine) of a diametrical plane P-P of the drum 2 perpendicular to the axis of advance X-X of the stripping head 1 during operation, or in other words, behind the tangent T issuing from a radius of said drum perpendicular to the vine row. It extends preferably over the whole height of the perforated side wall of drum 2 crossed by the inlet flow.

The helical cutter bar 48 is mounted on a fixed component of the stripping head chassis through known fixing means, permitting to adjust the distance of said cutter bar from the suction drum 2 and also to adjust its position in relation to the periphery of the latter.

For example, the sleeve 53 may comprise an upper mounting plate 58 equipped with arc-shaped ports 58a though which to run the stems of the link units so as to allow for adjustable mounting of the cutter bar on the fixed component of the stripping head chassis.

A self-regulating device ensures the driving in rotation of the cutting screw 49 at a speed equal to the forward speed of the perforated track 41 so that the faster said track moves, the quicker said cutting screw turns.

It then becomes apparent that when the machine is moving, the leaves are stuck against the grid-type track 41 and entrained through the suction action generated by the suction drum 2. Whenever the helical cutter bar 48 comes by, this entrainment effect is supplemented by the entrainment action of the cutting screw 49 turning in the opposite direction.

The stalks are cut off whenever the sharp edge 52 of helical thread 51 presses them against the fixed fingers 57 of the back blade 53 and the grape bunches are pushed back and deflected outward. FIG. 28 shows a severing sequence for a stalk Q of a vine leaf FV using the helical cutter bar 48 under the invention; the arrows represent the air flow generated by the suction drum 2 and running trough the perforated track 41 and the grid-type side wall of said drum.

Figure 31:
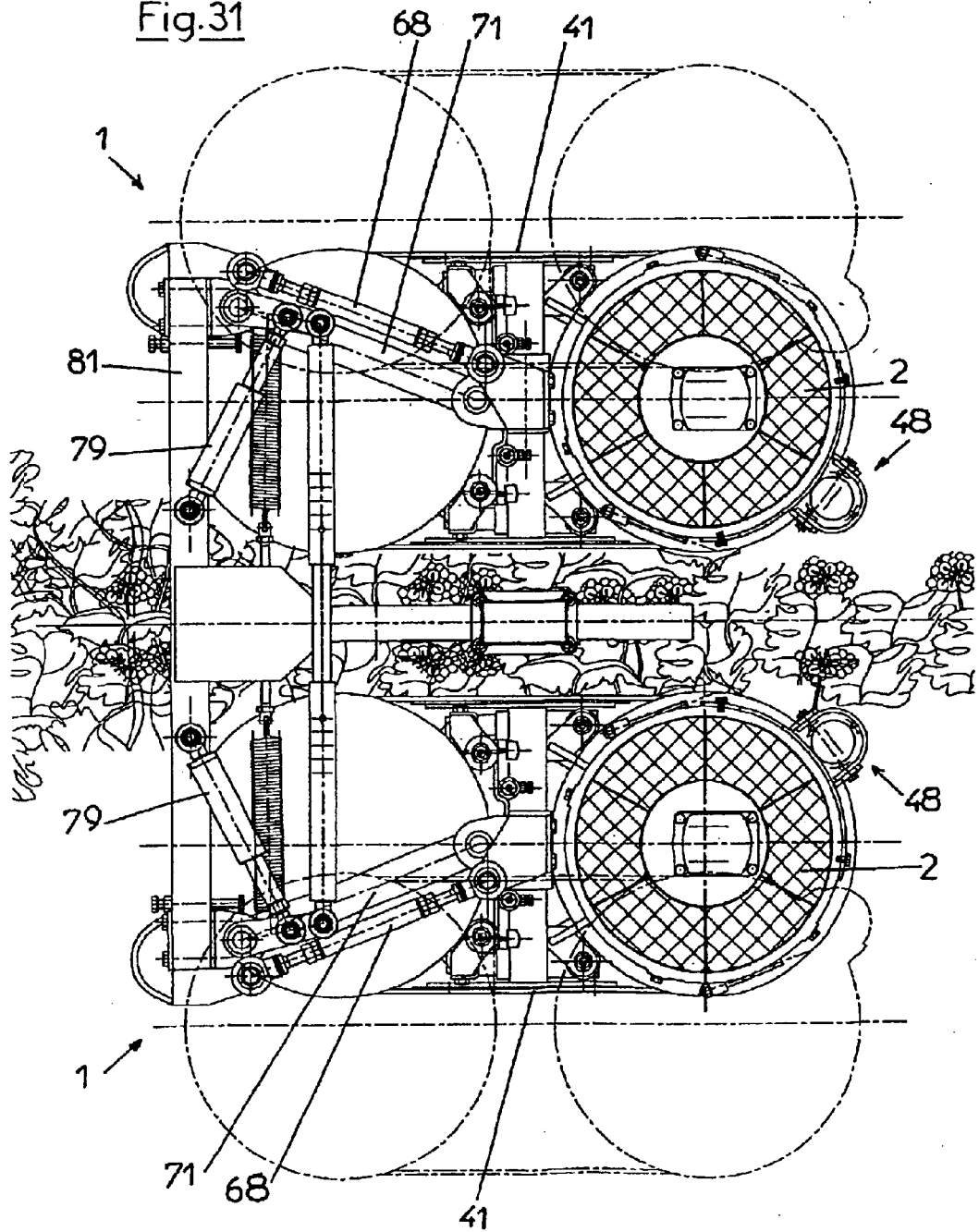
FIG. 31 is a plan view showing the lateral movement of the stripping modules in relation to the plant cover.
Figure 32:
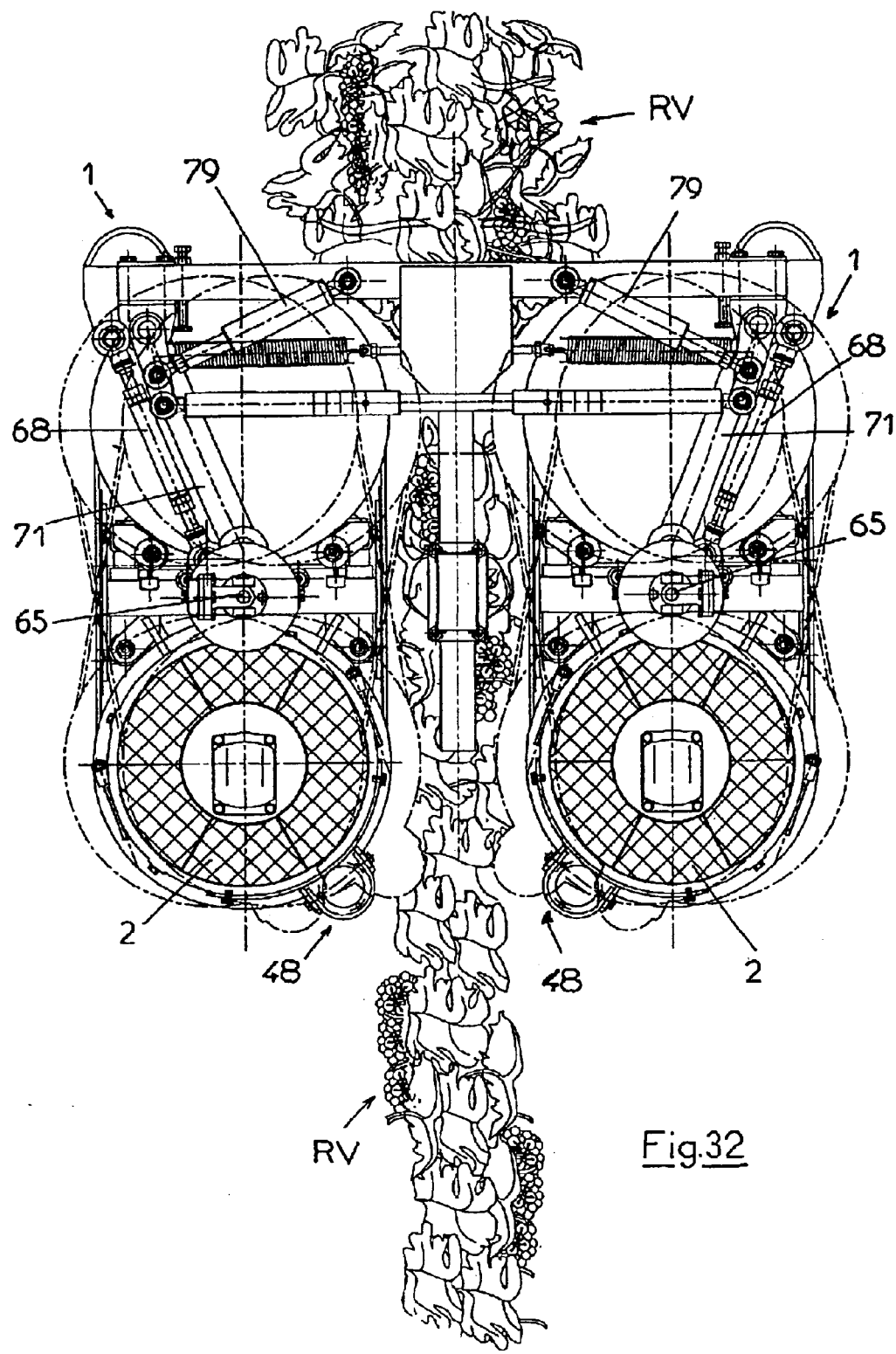
FIG. 32 is a plan view, with partial tearing, showing the vertical pivoting of the stripping modules in relation to the plant cover.
Figure 33:
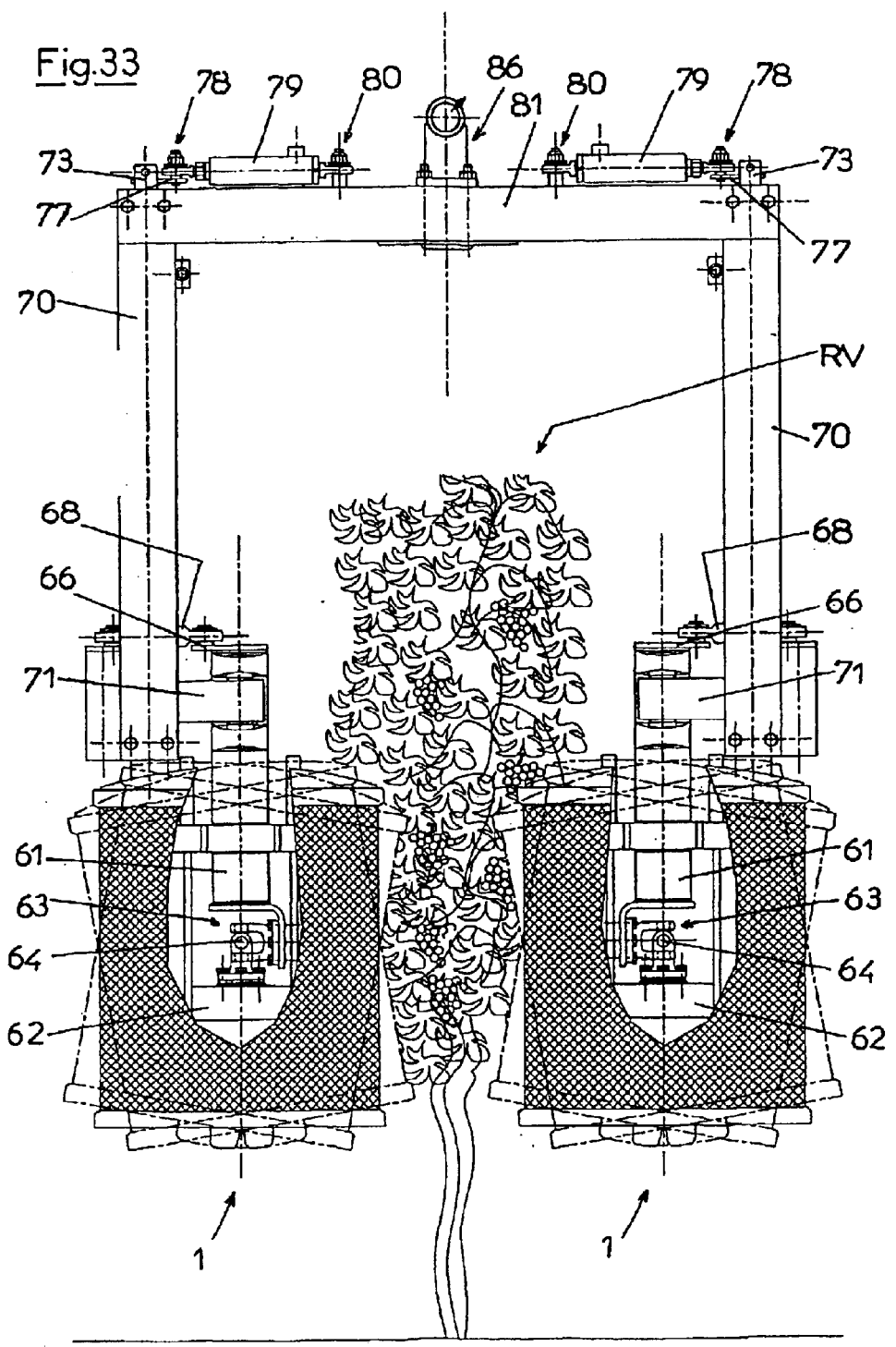
FIG. 33 is a front view, with partial tearing, showing the horizontal tilting of the stripping modules in relation to the plant cover.

The stripping head or each stripping head is carried by a frame designed to be able to be installed in a removable manner on a farm tractor or other carrier. In addition, the stripping head or each stripping head is mounted on this frame with:

capability of lateral movement in a direction perpendicular to the direction of advance of the leaf stripper during operation so as to keep it against the plant cover MV (FIG. 31);

capability of limited-amplitude pivoting around a vertical axis so as to be able to longitudinally follow the profile of the plant cover MV (FIG. 32); and capability of limited-amplitude tilting around a horizontal axis to follow the profile of the plant cover MV in relation to the verticality of the latter (FIG. 33).

Each stripping head 1 is supported by a bracket 59 (supporting roller 42) and by a bracket 60 (supporting roller 2) making up the base of a mast comprising an upper part 61 and a lower part 62 joined together through a universal joint 63. Said joint makes it possible for the stripping head to pivot around a horizontal axis 64 (FIG. 33) and around a vertical axis 65 (FIG. 32).

The upper end of the mast 61–62 is integral with a horizontal plate 66 onto which is attached with a joint 67 one of the ends of an adjustable connecting rod 68 whose other end is jointed through joint 69 on a bracket 76 integral with the lower part of a post 70 of the chassis carrying the leaf stripping unit.

On the other hand, a sturdy horizontal arm 71 parallel to the connecting rod 68 is jointed through one of its ends and bearings 72 on the upper part 61 of mast 61–62. The end opposite to arm 71 is rigidly integral with a vertical control bar 73 mounted with a limited-amplitude pivoting capability through upper 74 and lower 75 bearings supported by post 70.

The adjustable connecting rod 68 and arm 71 make up the two large sides of a horizontal deformable parallelogram carrying the stripping head.

The upper part of the control bar 73 is integral with a connecting rod 77 connected through joint 78 at one end of a damper jack 79 whose other end is connected through a joint 80 on a horizontal beam 81 connecting both posts 70 of the leaf stripper carrier.

The damper jacks 79, through the connecting rod 77, bar 73, jointed parallelogram (comprising connecting rod 68 and arm 71) and mast 61–62, allow for the distancing of the stripping heads 1 at the entrance of the vine rows RV based on the thickness of the plant cover.

Whenever the damper jacks 79 are not actuated, their function is to damp the movement of the stripping heads that are pulled back in the direction of the axis of advance Y-Y of the leaf stripper through springs 82 acting in traction and connecting through their opposite ends, on one hand, a pivoting rod 83 integral with bar 73 and parallel to connecting rod 77, and, on the other hand, a central element 84 of the carrying chassis.

An adjustable connecting rod 85 is attached through its opposite ends and joint 86 to the ends of opening rods 77, said rod making it possible to maintain a minimum distance between both stripping modules.

Figure 34:
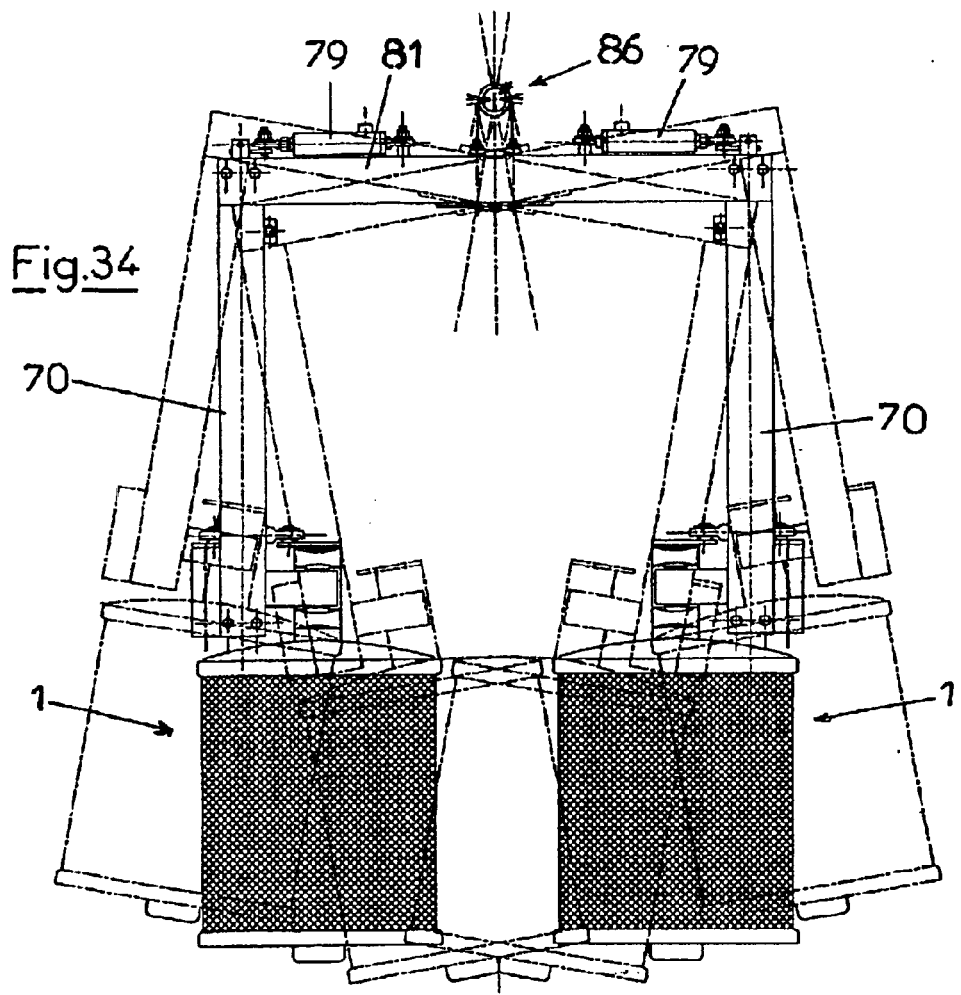
FIG. 34 is a side plan view illustrating the pivoting of the frame carrying the stripping modules.
Figure 35:
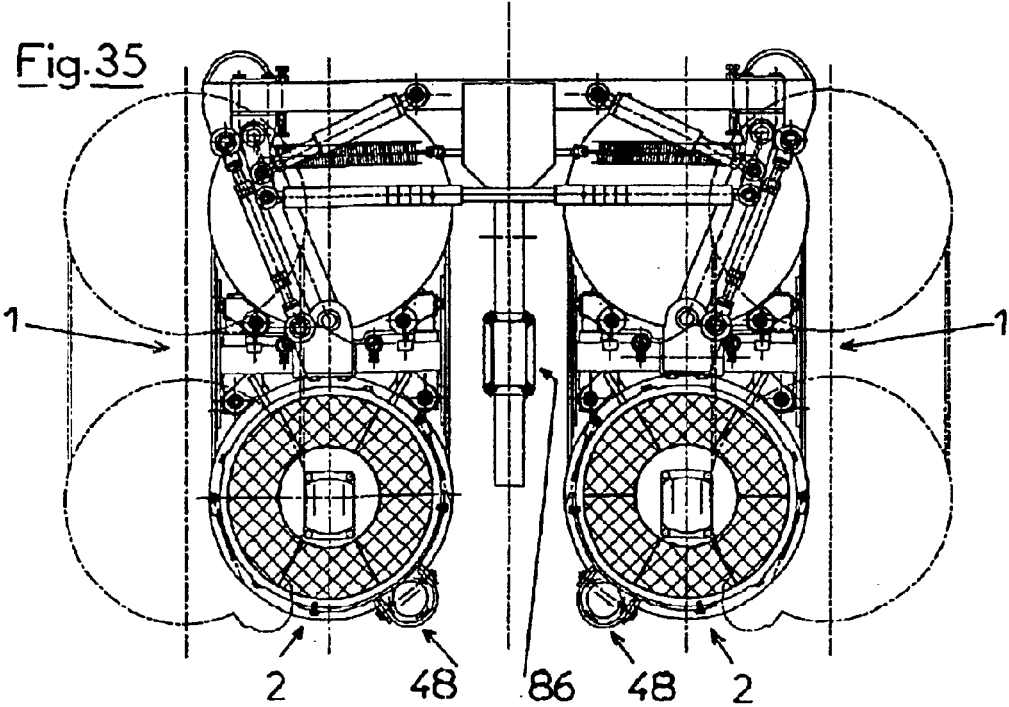
FIG. 35 is a plan view of FIG. 34.

The carrying chassis of the leaf stripper can be mounted in a removable manner through a mounting means 87 provided on a central upper element of its framework installed on a farm tractor with a capability to swing around an axis parallel to the axis of advance Y-Y of the leaf stripper so as to remain in the desirable position regardless of the conformation of the terrain on which the tractor is driving (FIG. 34).

In an advantageous manner, the stripping heads (1) are arranged during operation on either side of the axis of advance Y-Y of the leaf stripper so as to be able to bear in a balanced manner on both sides of a vine row RV that is thus protected against the effects of a force tending to push it back on one side; these stripping heads can be operated:

either one at a time, during the round trips of the leaf stripper, if one wishes to strip face of the vine row; or simultaneously if one wishes to strip each face of the vine row.

We claim:

1. A leaf stripping apparatus for stripping vines comprising:

a stripping head having a grid-type rotating suction drum, said drum having a perforated cylindrical side wall, said side wall having a changing portion, said drum rotatably mounted around a generally vertical axis, said drum suitable for positioning directly against the vines;

a suction means cooperative with said stripping head for generating an air flow through said perforated cylindrical side wall;

a channeling means formed on said stripping head for channeling said air flow through said changing portion of said side wall; and a cutter affixed to said stripping head adjacent said changing portion of said side wall, said cutter oriented generally parallel to said generally vertical axis of rotation of said rotating suction drum.

2. The apparatus of claim 1, said stripping head having a guide track with a grid-like endless belt wrapping around said rotating suction drum and around another drum placed in front of said rotating suction drum, said endless belt positioned on a side of said stripping head so as to face the vines during operation, said guide track having a portion parallel to an axis of advance of the leaf stripping apparatus so as to present a planar bearing surface.

3. The apparatus of claim 1, said cutter having a helical cutter bar with a cutting screw, said cutting screw being rotating cylindrical rod with a helical thread, said rotating cylindrical rod having at least one sharp edge and a back blade, said back blade having a fixed cylindrical sleeve open laterally, said cutting screw being housed within said fixed cylindrical sleeve, said fixed cylindrical sleeve having spaced curved fingers, said spaced curved fingers defining a plurality of back blades suitable for cutting of leaf stalks and deflecting grape bunches during operation of said stripping head by preventing the leaf stalks and grape bunches from penetrating into the spaces defined between said spaced curved fingers.

4. The apparatus of claim 2, further comprising:

a motor means connected to said rotating suction drum of said stripping head, said motor for driving said rotating suction drum in rotation, said endless belt interconnected between said rotating suction drum and said another drum so as to transmit rotational movement of said rotating suction drum to said another drum.

5. The apparatus of claim 2, said guide track having an upper edge and a lower edge, said upper and lower edges being reinforced with a cable that is buried in a smooth coating.

6. The apparatus of claim 2, said guide track being a wire lattice with an articulated mesh, said wire lattice extending over a height generally matching a height of said rotating suction drum and said another drum.

7. The apparatus of claim 2, said rotating suction drum and said another drum of said stripping head having upper and lower rims so as to center said guide track in place.

8. The apparatus of claim 2, said endless belt traveling at a speed inversely proportional to a speed of travel of the leaf stripping apparatus during operation.

9. The apparatus of claim 1, said channeling means comprising a deflector installed in a fixed manner within said rotating suction drum, said deflector having a side wall in which a suction port is provided, a major part of an area corresponding to a width of said suction port being arranged in a back of a diametrical plane of said rotating suction drum, said diametrical plane being perpendicular to an axis of travel of said stripping head.

10. The apparatus of claim 1, said cutter arranged in a back of a diametrical plane of said rotating suction drum, said diametrical plane oriented perpendicular to an axis of advance of said stripping head.

11. The apparatus of claim 1, said cutter extending over an entire height of a portion of said perforated side wall through which air flows from said suction means.

12. The apparatus of claim 3, said helical thread of said cutting screw having a lower sharp edge, said cutting screw being driven in rotation in a direction suitable for pushing down leaves of the vines.

13. The apparatus of claim 3, said cutting screw being driven in a rotation opposite to a direction of travel of said rotating suction drum.

14. The apparatus of claim 3, said helical thread of said cutting screw having a trapezoidal profile.

15. The apparatus of claim 3, said helical thread of said cutting screw having a pitch of approximately 30–40 millimeters.

16. The apparatus of claim 3, said upper end of said cutting screw being coupled to a drive motor mounted above said cutting screw.

17. The apparatus of claim 3, said spaced curved fingers of said back blade surrounding a portion of a periphery of said cutting screw corresponding approximately to one half of a cylindrical surface of said cutting screw.

18. The apparatus of claim 3, said spaced curved fingers having an upper sharp edge, said sharp edge being slightly inclined in a direction of a free end of said curved fingers.

19. The apparatus of claim 3, said spaced curved fingers having reinforcements oriented outwardly on one side thereof.

20. The apparatus of claim 3, said spaced curved fingers of said back blade having a pitch that is smaller than a pitch of said helical thread of said cutting screw.

21. The apparatus of claim 1, further comprising:

a fixing means for adjusting a distance of said cutter in relation to said rotating suction drum, said fixing means for adjusting a position of said cutter in relation to a periphery of said suction drum, said cutter being mounted on said fixing means.

22. The apparatus of claim 9, said deflector comprising:

a cylindrical shape positioned in an area where said suction port is positioned;

a conical shape positioned in a remaining area of a circumference of said port, said conical shape widening upwardly; and a cylindrical shape positioned in an upper area to which a large base of said conical shape and an upper edge of said cylindrical shape are connected.

23. The leaf stripper of claim 1, further comprising:

a cutting means arranged vertically in front of said stripping head and at a distance from said stripping head, said cutting means comprising a reciprocating cutter bar.

24. The apparatus of claim 1, further comprising:

a moving means connected to said stripping head for moving said stripping head further from or closer to an axis of advance of the leaf stripper apparatus.

25. The apparatus of claim 1, further comprising:

adjustment means connected to said stripping head for adjusting a position of said rotating suction drum in relation to the vertical axis.

26. The apparatus of claim 1, said stripping head having a bearing structure, said bearing structure being an elastic member holding said stripping head in a flexible manner and under constant pressure against the vines.

27. The apparatus of claim 1, said stripping head being pivotally mounted about a vertical axis so as to be suitable for following a profile of the vines in a longitudinal direction.

28. The apparatus of claim 1, said stripping head being tiltable about a horizontal axis parallel to a helical direction of travel of said stripping head during operation so as to follow a profile of the vines relative to a verticality of the vines.

29. The apparatus of claim 27, said stripping head being supported at a lower part of a mast formed of two parts attached with a universal joint, said mast allowing for tilting of said stripping head around a horizontal axis and around a vertical axis.

30. The apparatus of claim 29, said mast hanging from a deformable horizontal parallelogram suitable for allowing lateral movement of said stripping head.

31. The apparatus of claim 1, said stripping head comprising:

a pair of stripping heads so as to suitable to bear on both sides of a row of the vines, said pair of stripping heads capable of being operated individually or simultaneously.

* * * * *